US010113279B2

(12) United States Patent
Stevens et al.

(10) Patent No.: US 10,113,279 B2
(45) Date of Patent: Oct. 30, 2018

(54) BARRIER SYSTEMS WITH PROGRAMMABLE LIGHT ASSEMBLY

(71) Applicant: OFF THE WALL PRODUCTS, LLC, Salt Lake City, UT (US)

(72) Inventors: Eric M. Stevens, Salt Lake City, UT (US); Leo F. Stanko, Salt Lake City, UT (US); Ross D. Mann, Fruit Heights, UT (US)

(73) Assignee: Off The Wall Products, LLC, Salt Lake City, UT (US)

( * ) Notice: Subject to any disclaimer, the term of this patent is extended or adjusted under 35 U.S.C. 154(b) by 48 days.

(21) Appl. No.: 15/246,327

(22) Filed: Aug. 24, 2016

(65) Prior Publication Data

US 2017/0058470 A1 Mar. 2, 2017

Related U.S. Application Data

(60) Provisional application No. 62/208,969, filed on Aug. 24, 2015.

(51) Int. Cl.
*B60Q 7/00* (2006.01)
*G08G 1/00* (2006.01)
(Continued)

(52) U.S. Cl.
CPC ................ *E01F 9/547* (2016.02); *E01F 9/30* (2016.02); *E01F 9/40* (2016.02); *E01F 13/022* (2013.01);
(Continued)

(58) Field of Classification Search
CPC ..... E01F 9/547; E01F 9/30; E01F 9/40; E01F 13/022; G08G 1/095
(Continued)

(56) References Cited

U.S. PATENT DOCUMENTS 2,879,378 A 3/1959 Hemphill
4,040,759 A 8/1977 Skalle
(Continued)

FOREIGN PATENT DOCUMENTS

AU 50241/93 B 8/1994
CN 102116625 A 7/2011
(Continued)

OTHER PUBLICATIONS

Multi-Barrier, Model AR-10×96 Specification, Jan. 2003.
(Continued)

*Primary Examiner* — Eric M Blount
(74) *Attorney, Agent, or Firm* — Workman Nydegger

(57) ABSTRACT

A method for using barrier systems includes positioning a plurality of barrier systems at a location, each barrier system having: a barrier having an interior surface and an opposing exterior surface, the interior surface bounding a chamber that is adapted to receive a ballast; and a light assembly secured to the barrier, the light assembly comprising a housing having a lens that at least partially bounds a compartment, a light source at least partially disposed within the compartment, and programmable circuity in electrical communication with the light emitting device. A control device is used to communicate wirelessly with programmable circuity of each barrier system after the barrier systems are positioned at the location so that data is transferred between the control device and the programmable circuity of each barrier system.

23 Claims, 18 Drawing Sheets

(51) Int. Cl.

| | |
|---|---|
| ***E01F 9/547*** | (2016.01) |
| ***E01F 13/02*** | (2006.01) |
| ***E01F 9/30*** | (2016.01) |
| ***E01F 9/40*** | (2016.01) |
| ***G08G 1/095*** | (2006.01) |
| *G08G 9/00* | (2006.01) |
| *F21Y 115/10* | (2016.01) |
| *F21Y 113/10* | (2016.01) |
| *F21W 111/00* | (2006.01) |

(52) U.S. Cl.
CPC .......... *G08G 1/095* (2013.01); *F21W 2111/00* (2013.01); *F21Y 2113/10* (2016.08); *F21Y 2115/10* (2016.08); *G08G 9/00* (2013.01)

(58) Field of Classification Search
USPC ........................................................ 340/908.1
See application file for complete search history.

(56) References Cited

U.S. PATENT DOCUMENTS

| | | | |
|---|---|---|---|
| 4,143,857 A | 3/1979 | Weiner | |
| 4,498,660 A | 2/1985 | Brema et al. | |
| 4,614,181 A | 9/1986 | Karlsson | |
| 4,681,302 A | 7/1987 | Thompson | |
| 4,710,053 A * | 12/1987 | Kulp | E01F 9/688 116/63 P |
| 4,739,302 A | 4/1988 | Kinard | |
| 4,854,767 A | 8/1989 | Sasaki | |
| 4,869,018 A | 9/1989 | Scales et al. | |
| 5,011,325 A | 4/1991 | Antoniol | |
| 5,022,781 A | 6/1991 | Smith | |
| 5,080,523 A | 1/1992 | Steiner | |
| 5,123,773 A | 6/1992 | Yodock | |
| 5,197,601 A | 3/1993 | Sterett | |
| 5,249,112 A | 9/1993 | Bray | |
| 5,259,154 A | 11/1993 | Lilley | |
| 5,387,049 A | 2/1995 | Duckett | |
| 5,438,518 A | 8/1995 | Bianco et al. | |
| 5,498,101 A * | 3/1996 | Braverman | E01F 15/086 404/6 |
| 5,570,972 A | 11/1996 | Glass et al. | |
| 5,611,641 A | 3/1997 | Christensen | |
| 5,639,179 A | 6/1997 | Jensen | |
| 5,682,139 A | 10/1997 | Pradeep et al. | |
| D400,264 S | 10/1998 | Striefel et al. | |
| 5,836,714 A | 11/1998 | Christensen | |
| 5,901,526 A | 5/1999 | Vidmar et al. | |
| 5,949,195 A * | 9/1999 | Baarlie | H02J 7/0063 315/200 A |
| 5,988,934 A | 11/1999 | Wasserstrom | |
| 6,003,257 A | 12/1999 | Stokes | |
| 6,059,487 A | 5/2000 | Haga et al. | |
| 6,059,491 A | 5/2000 | Striefel et al. | |
| 6,086,285 A | 7/2000 | Christensen | |
| 6,116,811 A | 9/2000 | Goff | |
| 6,263,279 B1 | 7/2001 | Bianco et al. | |
| 6,339,745 B1 | 1/2002 | Novik | |
| D462,126 S | 8/2002 | England | |
| 6,666,616 B2 * | 12/2003 | Yodock, III | E01F 15/083 256/13.1 |
| 6,769,380 B1 | 8/2004 | Carvajalino et al. | |
| 6,837,647 B2 | 1/2005 | Tagg | |
| 6,961,398 B2 | 11/2005 | Dick et al. | |
| 6,963,282 B1 | 11/2005 | Yeates et al. | |
| 6,985,750 B1 | 1/2006 | Vicknair et al. | |
| 7,198,426 B2 | 4/2007 | Kang | |
| 7,275,888 B1 | 10/2007 | Christensen et al. | |
| 7,394,381 B2 | 7/2008 | Hanson et al. | |
| 7,407,341 B2 | 8/2008 | Yodock et al. | |
| 7,525,431 B2 | 4/2009 | Britton, Jr. et al. | |
| 7,572,022 B2 * | 8/2009 | Groeneweg | B60P 3/00 280/404 |
| 7,588,387 B1 | 9/2009 | Christensen et al. | |
| 7,789,585 B2 | 9/2010 | Christensen et al. | |
| 7,825,795 B2 | 11/2010 | Peel et al. | |
| 7,922,420 B2 | 4/2011 | Christensen et al. | |
| 8,009,034 B2 | 8/2011 | Dobson et al. | |
| 8,068,023 B2 | 11/2011 | Dulin et al. | |
| 8,089,390 B2 | 1/2012 | Jones et al. | |
| 8,159,338 B2 | 4/2012 | Breed | |
| 8,165,616 B2 | 4/2012 | Kobayashi et al. | |
| 8,167,512 B2 | 5/2012 | Christensen | |
| 8,453,995 B2 | 6/2013 | Christensen et al. | |
| 8,939,675 B2 | 1/2015 | Christensen et al. | |
| 9,334,614 B1 * | 5/2016 | Zoellner | E01F 9/669 |
| 9,601,012 B2 * | 3/2017 | Williams | G08G 1/07 |
| 2002/0025221 A1 | 2/2002 | Johnson | |
| 2003/0219308 A1 | 11/2003 | Boulais et al. | |
| 2004/0057790 A1 | 3/2004 | Tagg | |
| 2004/0196182 A1 | 10/2004 | Unnold | |
| 2005/0152744 A1 | 7/2005 | Straub | |
| 2005/0213329 A1 * | 9/2005 | Jones | F21V 21/08 362/276 |
| 2007/0098490 A1 | 5/2007 | Christensen | |
| 2007/0126598 A1 | 6/2007 | Carter et al. | |
| 2007/0193498 A1 | 8/2007 | Wells | |
| 2009/0003931 A1 * | 1/2009 | Christensen | B29C 49/482 404/6 |
| 2010/0253519 A1 | 10/2010 | Brackmann et al. | |
| 2011/0030875 A1 | 2/2011 | Conte et al. | |
| 2011/0065342 A1 | 3/2011 | Hudson | |
| 2011/0249430 A1 * | 10/2011 | Stamatatos | B60Q 1/2615 362/184 |
| 2011/0257831 A1 | 10/2011 | Shin | |
| 2011/0260869 A1 | 10/2011 | Gagnon et al. | |
| 2011/0263205 A1 | 10/2011 | Hoerdum et al. | |
| 2011/0285100 A1 | 11/2011 | Pazhoor | |
| 2011/0320256 A1 | 12/2011 | Florucci et al. | |
| 2012/0013464 A1 | 1/2012 | Roberts et al. | |
| 2012/0038633 A1 | 2/2012 | Clark et al. | |
| 2012/0075139 A1 | 3/2012 | Gagnon et al. | |

FOREIGN PATENT DOCUMENTS

| | | |
|---|---|---|
| EP | 0 550 362 A1 | 7/1993 |
| EP | 1189011 A1 | 3/2002 |
| FR | 2782331 A1 | 2/2000 |

OTHER PUBLICATIONS

Flyer by Armorcast entitled *Guardian Low Profile Barricade Portable Protection and Security to Keep your World in Control*, published at least as early as Jun. 3, 2008.
Fact Sheet, *Airport Low-Profile Barricade*, published at least as early as Dec. 21, 2005.
Road Barriers by Oaklands Plastics Ltd., www.oaklandsplastic.com/safety-barriers/road-barriers.asp?Mn=31, published at least as early as Jun. 27, 2007.
Track Barriers by Oaklands Plastics Ltd., www.oaklandsplastic.com/safety-barriers/road-barriers.asp?Mn=31, published at least as early as Jun. 27, 2007.
Roo Guards Products, Safety Barricades, www.rooguards.com/products.htm, published at least as early as Jun. 27, 2007.

* cited by examiner

BARRIER SYSTEMS WITH PROGRAMMABLE LIGHT ASSEMBLY

CROSS-REFERENCE TO RELATED APPLICATIONS

This application claims the benefit of Provisional Ser. No. 62/208,969, filed Aug. 24, 2015, which for purposes of disclosure is incorporated herein by specific reference.

BACKGROUND OF THE INVENTION

1. The Field of the Invention

The present invention relates to lighted barriers and, more particularly, to portable, reusable, control barriers having a programmable light assembly.

2. The Relevant Technology

Control barriers are used in a variety of situations. For example, control barriers can be selectively positioned at special events or construction sites to help direct pedestrian and automobile traffic in a desired direction. Similarly, control barriers can be used at airports to delineate construction zones and direct ground traffic and taxiing aircraft in a desired direction. Alternatively, control barriers can be put up to help limit access to select areas. In yet other embodiments, control barriers can be put up to define an entertainment stage or the boundaries of a playing field. For example, control barriers can be used to define the boundaries of a soccer field or an ice skating rink.

One type of barrier comprises a plastic molded housing. The plastic barriers are hollow so that they can be filled with water for stabilizing. The water also helps to absorb impact. Lights are often mounted on the plastic barriers to help increase visibility, provide warning, and/or better direct traffic. The lights are often mounted by initially molding a special surface on the barrier to receive the light and then using a bolt to secure the light to the barrier.

Although lights are useful on control barriers, they have limited versatility, typically only being capable of flashing at set intervals. Accordingly, what is needed is improved barrier systems with lights that have greater versatility for use in different situations.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

Figure 1:
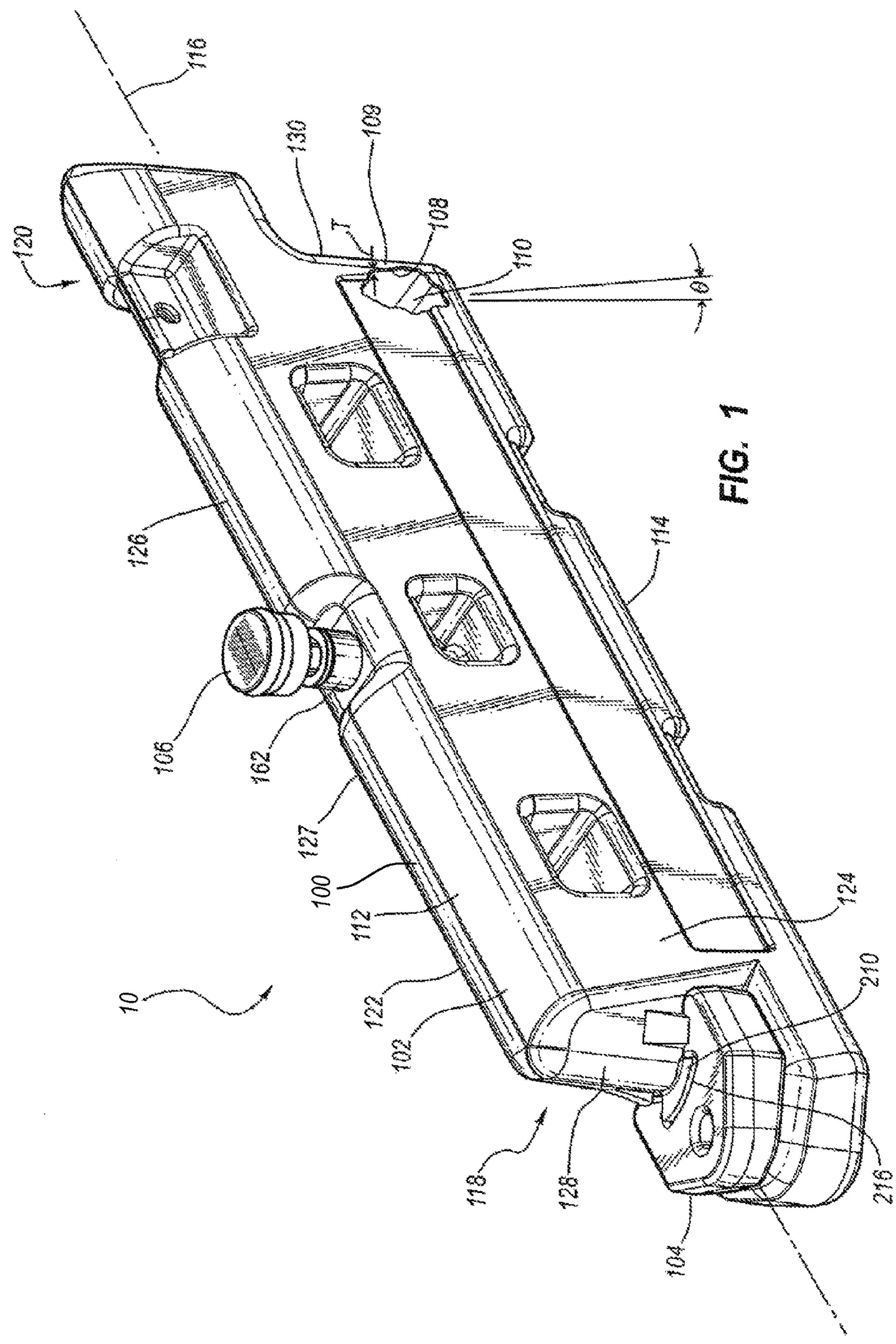
FIG. 1 is a top perspective view of one embodiment of a barrier system according to the present invention.

Before describing the present disclosure in detail, it is to be understood that this disclosure is not limited to parameters of the particularly exemplified systems, methods, apparatus, products, processes, compositions, and/or kits, which may, of course, vary. It is also to be understood that the terminology used herein is only for the purpose of describing particular embodiments of the present disclosure, and is not necessarily intended to limit the scope of the disclosure in any particular manner. Thus, while the present disclosure will be described in detail with reference to specific configurations, the descriptions are illustrative and are not to be construed as limiting the scope of the claimed invention. Various modifications can be made to the illustrated configurations without departing from the spirit and scope of the invention as defined by the claims. Thus, while various aspects and embodiments have been disclosed herein, other aspects and embodiments are contemplated.

Unless defined otherwise, all technical and scientific terms used herein have the same meaning as commonly understood by one of ordinary skill in the art to which the present disclosure pertains. While a number of methods and materials similar or equivalent to those described herein can be used in the practice of the present disclosure, only certain exemplary materials and methods are described herein.

Various aspects of the present disclosure, including devices, systems, methods, etc., may be illustrated with reference to one or more exemplary embodiments or implementations. As used herein, the terms "alternative embodiment" and/or "exemplary implementation" means "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

It will be noted that, as used in this specification and the appended claims, the singular forms "a," "an" and "the" include plural referents unless the content clearly dictates otherwise. Thus, for example, reference to a "panel" includes one, two, or more panels. Similarly, reference to a plurality of referents should be interpreted as comprising a single referent and/or a plurality of referents unless the content and/or context clearly dictate otherwise. Thus, reference to "panels" does not necessarily require a plurality of such panels. Instead, it will be appreciated that independent of conjugation; one or more panels are contemplated herein.

As used throughout this application the words "can" and "may" are used in a permissive sense (i.e., meaning having the potential to), rather than the mandatory sense (i.e., meaning must). Additionally, the terms "including," "having," "involving," "containing," "characterized by," variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled", "attached", "connected," and/or "joined" are used to indicate either a direct connection between two components or, where appropriate, an indirect connection to one another through intervening or intermediate components. In contrast, when a component is referred to as being "directly coupled", "directly attached", "directly connected," and/or "directly joined" to another component, no intervening elements are present or contemplated. Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "left," "right," "up," "down," "upper," "lower," "inner," "outer," "internal," "external," "interior," "exterior," "proximal," "distal" and the like can be used solely to indicate relative directions and/or orientations and may not otherwise be intended to limit the scope of the disclosure, including the specification, invention, and/or claims.

Where possible, like numbering of elements have been used in various figures. Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and or sub-elements of a parent element may each include separate letters appended to the element number. In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where a range of values (e.g., less than, greater than, at least, and/or up to a certain value, and/or between two recited values) is disclosed or recited, any specific value or range of values falling within the disclosed range of values is likewise disclosed and contemplated herein. Thus, disclosure of an illustrative measurement or distance less than or equal to about 10 units or between 0 and 10 units includes, illustratively, a specific disclosure of: (i) a measurement of 9 units, 5 units, 1 units, or any other value between 0 and 10 units, including 0 units and/or 10 units; and/or (ii) a measurement between 9 units and 1 units, between 8 units and 2 units, between 6 units and 4 units, and/or any other range of values between 0 and 10 units.

It is also noted that systems, methods, apparatus, devices, products, processes, compositions, and/or kits, etc., according to certain embodiments of the present invention may include, incorporate, or otherwise comprise properties, features, components, members, and/or elements described in other embodiments disclosed and/or described herein. Thus, reference to a specific feature in relation to one embodiment should not be construed as being limited to applications only within said embodiment.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The headings used herein are for organizational purposes only and are not meant to be used to limit the scope of the description or the claims. To facilitate understanding, like reference numerals have been used, where possible, to designate like elements common to the figures.

Depicted in FIG. 1 is one embodiment of an inventive barrier system 10 incorporating features of the present invention. Barrier system 10 comprises a barrier 100 and a light assembly 106 removably attached thereto. In the depicted embodiment, barrier 100 comprises a housing 102 and a separate, discrete coupler 104 removably attached thereto. In other embodiments, as discussed herein, barrier 100 can have a variety of different configurations and can comprise a single unitary member as opposed to two or more parts coupled together. Thus, in other embodiments, coupler 104 can be integrally formed with housing 102.

Housing 102 has an interior surface 108 and an opposing exterior surface 109, the interior surface 108 bounding a chamber 110 that is adapted to receive a ballast. As used in the specification and appended claims, the term "ballast" is broadly intended to include any materials which can be poured into internal chamber 110. By way of example and not by limitation, the ballast can include water, salt water, non-freezing fluids, sand, rock, cement, concrete, and the like.

Figure 2:
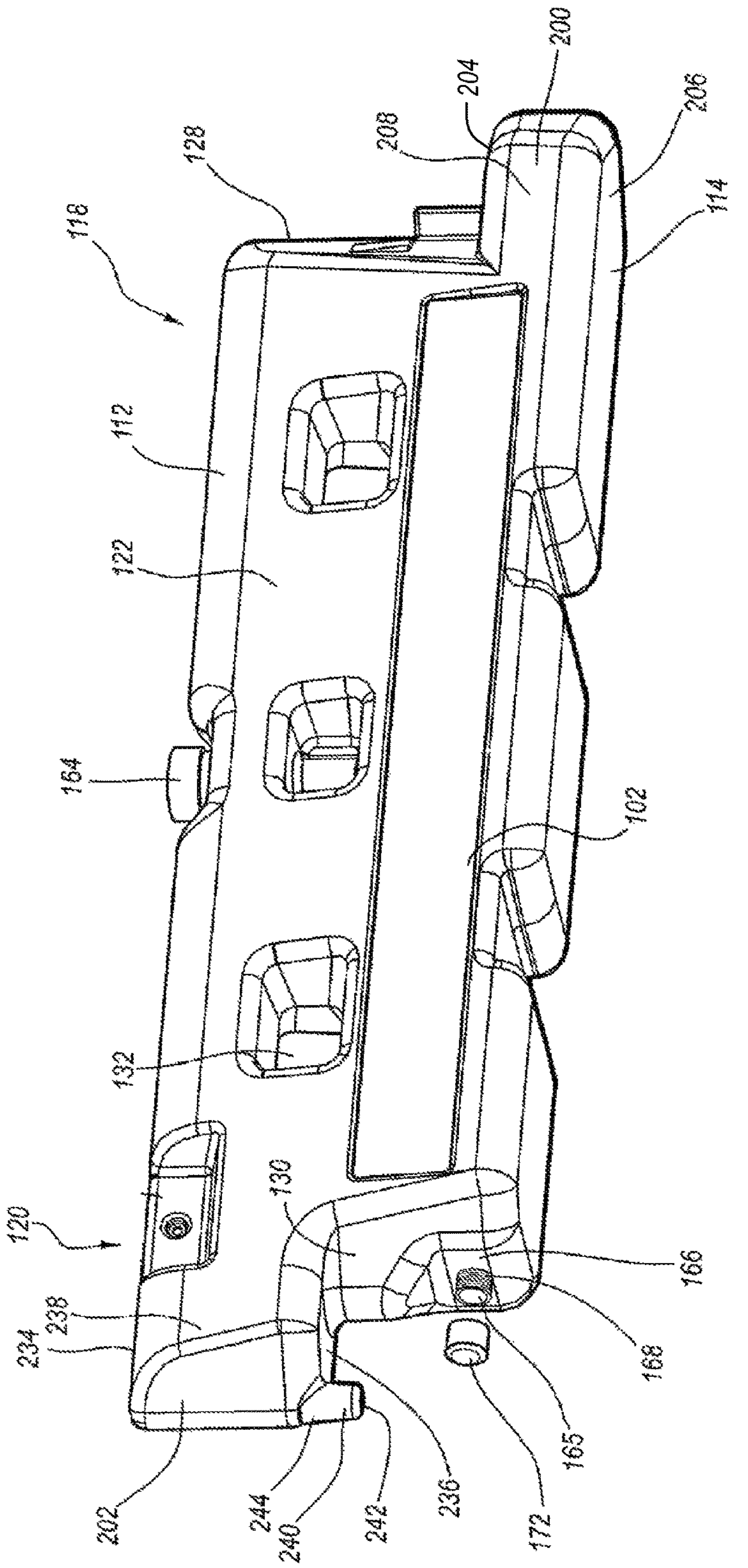
FIG. 2 is a bottom perspective view of the housing of the barrier shown in FIG. 1.

As shown in FIGS. 1 and 2, housing 102 comprises a central body portion 112 having a floor 114 and a longitudinal axis 116 extending between a first end 118 and an opposing second end 120. Central body portion 112 further comprises opposing side walls 122 and 124 extending between floor 114 and a top wall 126 at an upper portion 127 of housing 102. Floor 114, side walls 122 and 124, and top wall 126 each extend from a first end face 128 at the first end 118 of housing 102 to a second end face 130 disposed at the second end 120 of housing 102. First end face 128 and second end face 130 can be substantially flat, curved, or have other configurations. In the depicted embodiment, first end face 128 and second end face 130 are each curved outwardly so as to form a bowed surface between opposing sided walls 122 and 124.

Top wall 126 can be rounded, as depicted in FIG. 1, or can be flat, or have other shapes. Side walls 122 and 124 are depicted as sloping downward and away from top wall 126. That is, side walls 122 and 124 are relatively closer to each other where side walls 122 and 124 adjoin top wall 126 than where side walls 122 and 124 adjoin floor 114. In other embodiments, side walls 122 and 124 are relatively parallel to each other and in still other embodiments, side walls 122 and 124 can be relatively closer to each other where side walls 122 and 124 adjoin floor 114 than where side walls 122 and 124 adjoin top wall 126.

Although not required, in the depicted embodiment of the present invention, one or more through holes 132 are formed in barrier 100 which extend through housing 102 between side wall 122 and sidewall 124. In part, through holes 132 function to provide structural strength and stability to barrier 100. In other embodiments, instead of extending all the way through barrier 100, a partition can be formed to divide through hole 132 into separate recesses. That is, portions of side walls 122 and 124 can be recessed and centrally connected by forming a kiss-off. Examples of kiss-offs that can be used in the present invention are disclosed in U.S. patent application Ser. No. 11/360,820, filed Feb. 23, 2006 and entitled Barriers with Interlocking Sides which is incorporated herein by specific reference.

Figure 3:
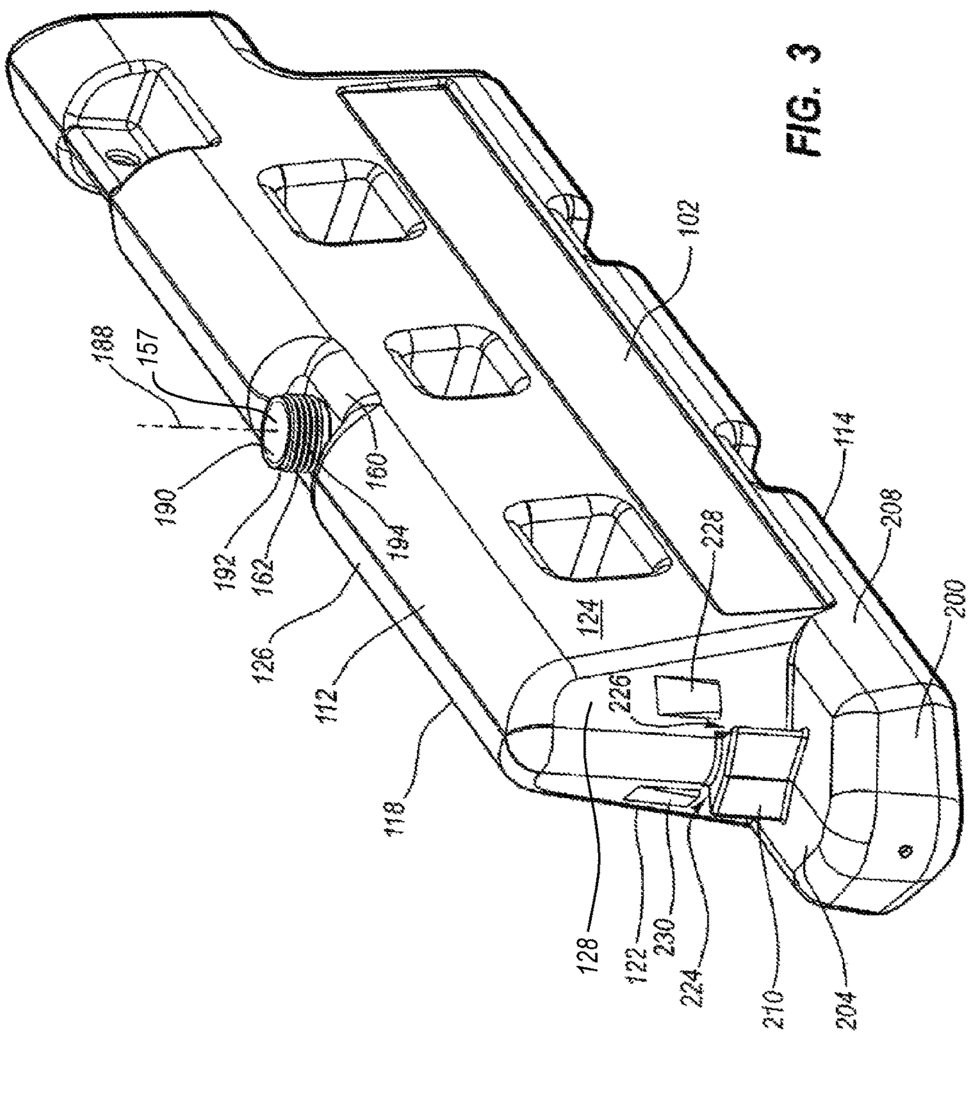
FIG. 3 is a top perspective view of one end of the housing of the barrier shown in FIG. 1, with the coupler removed from the barrier.

Turning to FIG. 3 in conjunction with FIG. 1, a notch 160 is formed on top wall 126. Outwardly projecting from notch 160 is a tubular stem 162. Stem 162 has an inside surface 190 and an opposing outside surface 192. Inside surface 190 bounds an inlet port 157 having a central axis 188. Inlet port 157 extends through housing 102 so as to communicate with chamber 110. Accordingly, barrier 100 can be filled with ballast by passing the ballast through inlet port 157 and into chamber 110.

A helical thread 194 is formed on outside surface 192 of stem 162. Inlet port 157 can be selectively closed or sealed by a cap 164 (FIG. 2) having an inside helical thread corresponding to the helical thread 194 formed on stem 162 so as to allow cap 164 to threadedly engage stem 162. As will be discussed below in greater detail, inlet port 157 can also be selectively closed by light assembly 106 (FIG. 1) so as to eliminate the need for cap 164. Stem 162 can be separately connected to housing 102 or can be integrally formed as a unitary member with housing 102. Notch 160 provides a partially protected space for stem 162 and related cap 164 or light assembly 106.

Figure 4:
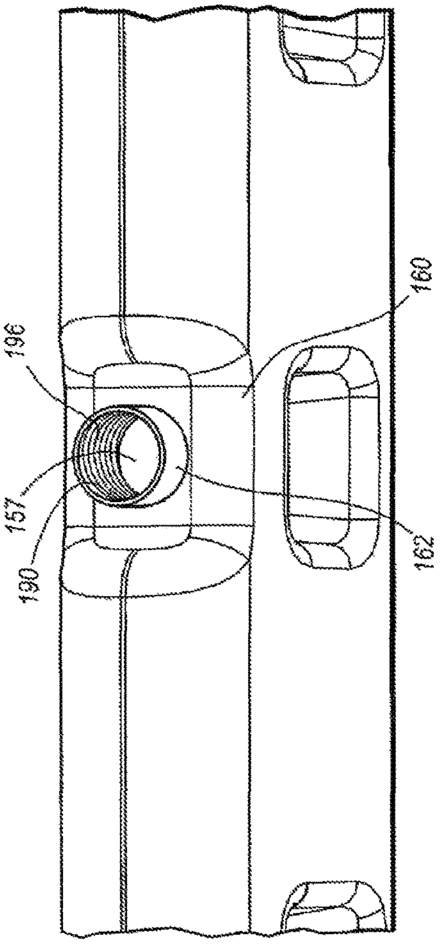
FIGS. 4 and 5 are top perspective views of alternative embodiments of an inlet port according to the present invention.

In one alternative as shown in FIG. 4, a helical thread 196 can be formed on the inside surface 190 of stem 162. A corresponding plug (not shown) having a matching outside helical thread can be selectively screwed into stem 162 so as to close or seal inlet port 157.

Figure 5:
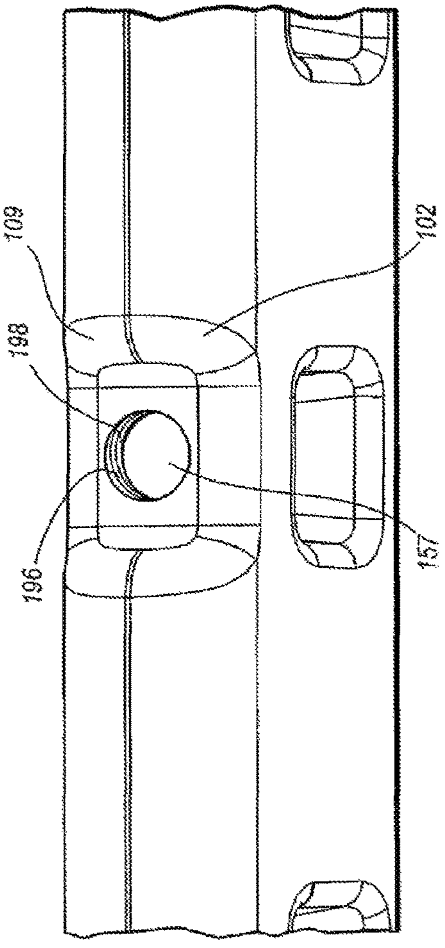

In another embodiment, as shown in FIG. 5, stem 162 is omitted altogether. In this embodiment, the helical thread 196 is formed on a sidewall 198 of housing 102 that encircles inlet port 157. Sidewall 198 can be formed on a portion of housing 102 within notch 160 or elsewhere on housing 102. It is appreciated that, inlet port 157 can be positioned at other locations on barrier 100 and can be formed within or without of notch 160. For example, inlet port 157 can be formed with or without stem 162 directly on housing 102 anywhere on top wall 126.

Returning to FIG. 2 in conjunction with FIG. 1, second end face 130 of housing 102 has a lower portion 166 near floor 114 that is recessed. Outwardly projecting from second end face 130 within lower portion 166 is a threaded tubular stem 168. Stem 168 bounds an outlet port 165 that extends through housing 102 so as to communicate with chamber 110. By virtue of its position near floor 114, outlet port 165 can be used to selectively drain ballast from barrier 100.

A cap or plug 172 can be screwed into or onto or otherwise attached to stem 168 so as to seal outlet port 165 closed. In alternative embodiments, outlet port 165 can be positioned at other locations on barrier 100. Likewise, as with inlet port 157, outlet port 165 can be formed without stem 168. It is noted that by recessing lower portion 166, a partially protected space is provided for stem 168 and related cap or plug 172.

As shown in FIGS. 2 and 3, housing 102 further includes a first projection portion 200 and a second projection portion 202 respectively projecting longitudinally outward from first end face 128 and second end face 130 of central body portion 112. Projections 200 and 202 are configured such that for identical housings 102, the second projection portion 202 of one housing can overlap a coupler 104 mounted onto the first projection portion 200 of the other housing while the floor 114 of both housings are resting on a common support surface, as discussed in further detail below.

As shown in FIGS. 2 and 3, first projection portion 200 comprises a top surface 204 and an opposing bottom surface 206 with a perimeter sidewall 208 extending therebetween. In the embodiment depicted, bottom surface 206 of first projection portion 200 lies in the same plane as floor 114 of central body portion 112 and is thus substantially horizontally displaced. Bottom surface 206 alternatively can lie in a different plane than floor 114. Top surface 204 projects longitudinally outward from first end face 128 on first end 118 and is substantially parallel to bottom surface 206 and thus substantially horizontally disposed in the embodiment depicted. Perimeter sidewall 208 extends between top surface 204 and bottom surface 206. First projection portion 200 angles in on a distal end such that the end of first projection portion 200 comes to a point or is substantially semi-circular when viewed from a position perpendicular to bottom surface 206 of first projection 200. In the embodiment depicted, one end of sidewall 208 attaches to central body portion 112 and lies in the same plane as side wall 122 and the other end of sidewall 208 attaches to central body portion 112 and lies in the same plane as side wall 124.

In one embodiment of the present invention means are provided for securing coupler 104 to housing 102 after coupler 104 and housing 102 are separately formed. This means for securing can be a selectively removable connection or a permanent connection. By way of example and not by limitation, a tenon and mortise arrangement can be used to interlock coupler 104 to housing 102 as shown in FIG. 1. Specifically, as depicted in FIG. 3, a tenon 210 projects from end face 128 of central body portion 112 and from the top surface 204 of first projection portion 200.

In the depicted embodiment, locking members 228 and 230 are formed on first end face 128 of central body portion 112, on each side of tenon 210, to help prevent unwanted vertical separation between coupler 104 and housing 102.

Figure 6:
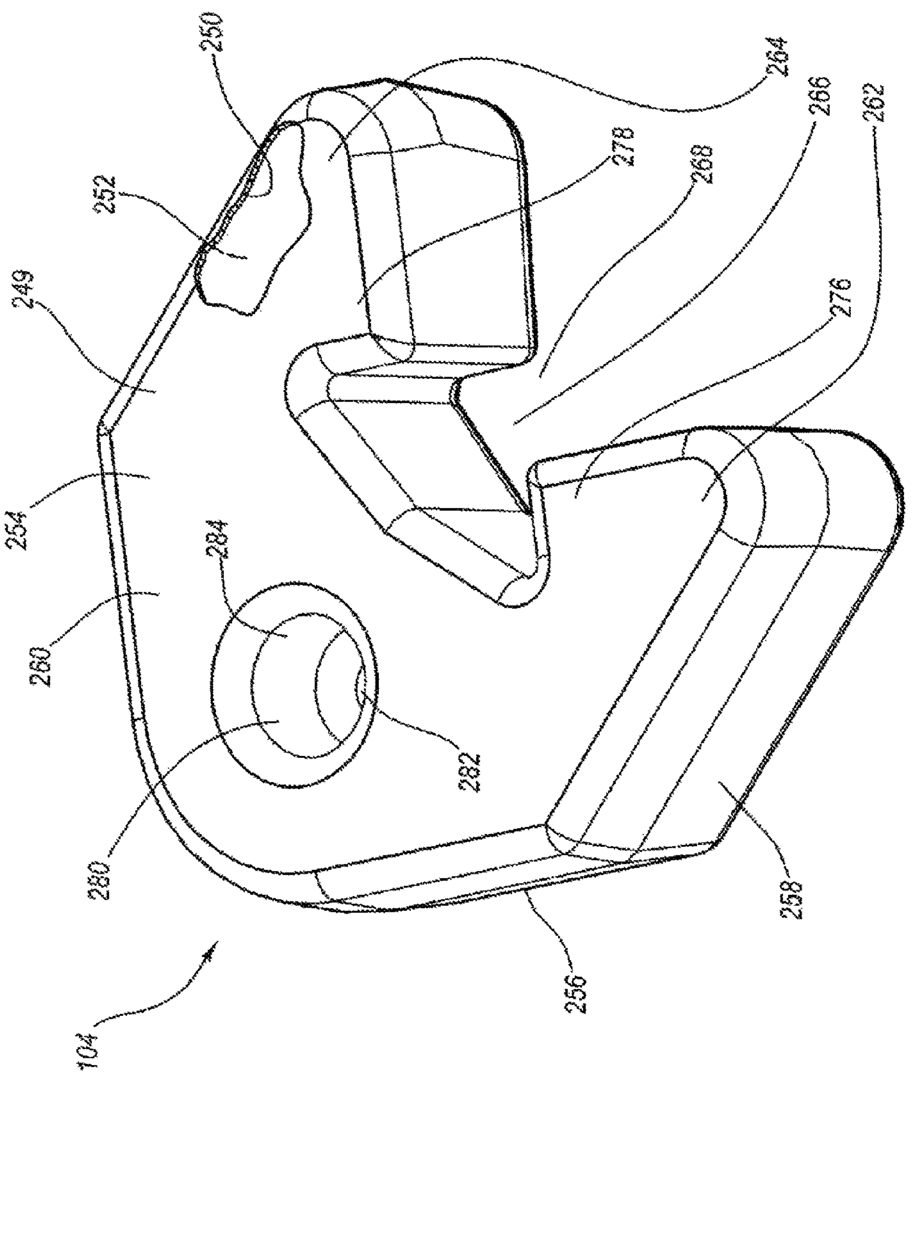
FIG. 6 is a top perspective view of the coupler of the barrier shown in FIG. 1.

Turning to FIG. 6, coupler 104 has an exterior surface 249 and an interior surface 250 bounding a compartment 252. In one alternative, coupler can be formed as a solid structure. Coupler 104 comprises a top wall 254 and a spaced apart bottom wall 256 with a perimeter sidewall 258 extending therebetween. Coupler 104 further includes an opening 280 formed on top wall 254 of coupler 104 and extending toward bottom wall 256. Opening 280 is bounded by a floor 282 and an annular sidewall 284 extending from top wall 254 to floor 282. In some embodiments, end wall 282 is omitted. In those embodiments, sidewall 284 extends all the way through coupler 104 between top wall 254 and bottom wall 256. Although depicted as having a substantially circular transverse cross-sectional configuration, in other alternative embodiments opening 280 can have an oblong, irregular, or polygonal transverse cross-sectional configuration. As discussed below, opening 280 is sized and shaped to selectively engage with an identical second barrier 100.

Coupler 104 is configured to connect with tenon 210 of housing 102. Specifically, coupler 104 is substantially U-shaped and comprises a main body 260 having arms 262 and 264 extending from opposing sides thereof. Main body 260 and arms 262, 264 partially bound a mortise 266 having an open mouth 268 formed between arms 262 and 264. Mortise 266 extends completely through coupler 104 between top wall 254 and bottom wall 256. Arms 262 and 264 include projection portions 276 and 278, respectively, which extend toward each other so as to cause mortise 266 to constrict at mouth 268. Mortise 266 has a dove tail or generally triangular transverse cross section that is complementary to tenon 210.

To mount coupler 104 onto housing 102, coupler 104 is vertically placed over first projection portion 200 of housing 102 so that mortise 216 formed on coupler 104 is directly above tenon 210 formed on housing 102. Coupler 104 is then pushed down so that projection portions 276 and 278 of coupler 104 are received into channels 224 and 226 formed by tenon 210 and so that tenon 210 is received into mortise 266. As coupler 104 is slid over tenon 210, arms 262 and 264 of coupler 104 biases against outwardly projecting locking members 228 and 230. Due to slight resilient deformation in arms 262 and 264 and/or locking members 228 and 230, coupler 104 is able to pass over locking member 228 and 230 under the applied vertical downward force.

Figure 7:
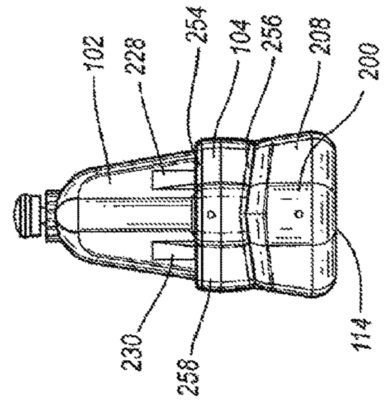
FIG. 7 is an end view of one end of the barrier, with the coupler attached to the housing.

Once coupler 104 has completely passed over locking members 228 and 230 so that tenon 210 is received within mortise 266 and coupler 104 rests upon top surface 204 of first projection 200, as shown in FIG. 7, arms 262 and 264 and/or locking members 228 and 230 resiliently rebound to their natural resting position. In this position, locking members 228 and 230 project out over a small portion of coupler 104 so as to prevent coupler 104 from unintentionally vertically separating off of tenon 210. In this resting position, the engagement between tenon 210 and mortise 266 prevents coupler 104 from being horizontally detached from housing 102 and also provides a substantially rigid connection between housing 102 and coupler 104.

It is appreciated that other methods and structures can also be used for securing coupler 104 to housing 102. For example, it is appreciated that tenon 210 and mortise 266 can have a variety of different interlocking configurations. In still other embodiments, it is appreciated that tenon 210 can be formed on coupler 104 and that mortise 266 can be formed on housing 102. In still other embodiments, the mortise and tenon can be eliminated. For example, coupler 104 and housing 102 can be connected together by welding, adhesive, press fit connection, bolts, screws, rivets, latches, and other types of fasteners.

Turning to the other end of housing 102 as depicted in FIG. 2, second projection portion 202 projects longitudinally outward from second end face 130 of central body portion 112. Second projection portion 202 comprises a top surface 234 and an opposing bottom surface 236 with a perimeter sidewall 238 extending therebetween.

In the embodiment depicted, top surface 234 of second projection portion 202 follows the same contour as top wall 126 of central body portion 112. Top surface 234 alternatively can follow a different contour than top wall 126 or lie in a single plane. Bottom surface 236 projects longitudinally outward from second end face 130 on second end 120 and is substantially parallel to top surface 204 of first projection portion 200.

In one embodiment, bottom surface 236 of second projection portion 202 has an elevational location higher than top surface 204 of first projection portion 200 when the floor 114 of central body portion 112 is disposed on a level ground surface. Bottom surface 236 typically has an elevational location substantially equal to or above top wall 254 of coupler 104 when coupler 104 is mounted on first projection portion 200 and when floor 114 of central body portion 112 is disposed on a level ground surface. The term "above" is defined as being a further distance away from floor 114.

Projecting downward from bottom surface 236 of second projection portion 202 is a post 240. Post 240 comprises a bottom face 242 at a bottom end 243 of post 240 with a perimeter sidewall 244 extending between bottom face 242 and bottom surface 236 of second projection portion 202. Post 240 is depicted has having a substantially circular cross-sectional shape. In other embodiments, post 240 can alternatively have a polygonal, oblong, or any other cross-sectional shape.

Figure 8:
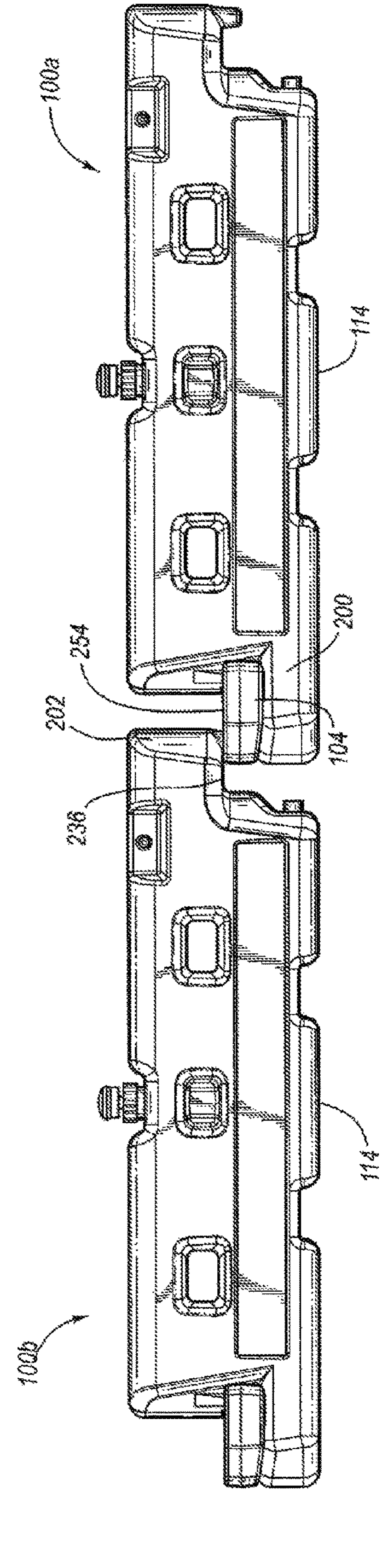
FIG. 8 is a side view of a pair of barriers shown in FIG. 1 coupled together.

As depicted in FIG. 8, because bottom surface 236 of second projection portion 202 is either in the same plane as or above top wall 254 of coupler 104, the second projection portion 202 of one housing 100*b* can overlap the coupler 104 mounted to first projection portion 200 of another identical housing 100*a* while floors 114 of both housings are resting on a common support surface. In one embodiment of the present invention means are provided for removably connecting a separate barrier to coupler 104. By way of example and not by limitation, the means for removably connecting can comprise the opening 280 (FIG. 6) formed on coupler 104, opening 280 being configured to receive post 240. That is, by inserting post 240 of barrier 100*b* into opening 280 formed on coupler 104 of first barrier 100*a*, barrier 100*b* is connected to barrier 100*a* in that the barriers cannot be horizontally separated.

Although opening 280 has been disclosed as being disposed on top wall 254 of coupler 104 and post 240 has been disclosed as projecting from bottom surface 236 of second projection portion 202, it is appreciated that in alternate embodiments opening 280 can be formed on bottom surface 236 of second projection portion 202 and post 240 can alternatively extend up from top wall 254 of coupler 104. Furthermore, although post 240 is shown as being integrally formed with housing 102, in other embodiments post 240 can comprise a separate structure, such as a plastic or metal rod, that is connected to housing 102 or coupler 104.

Figure 9:
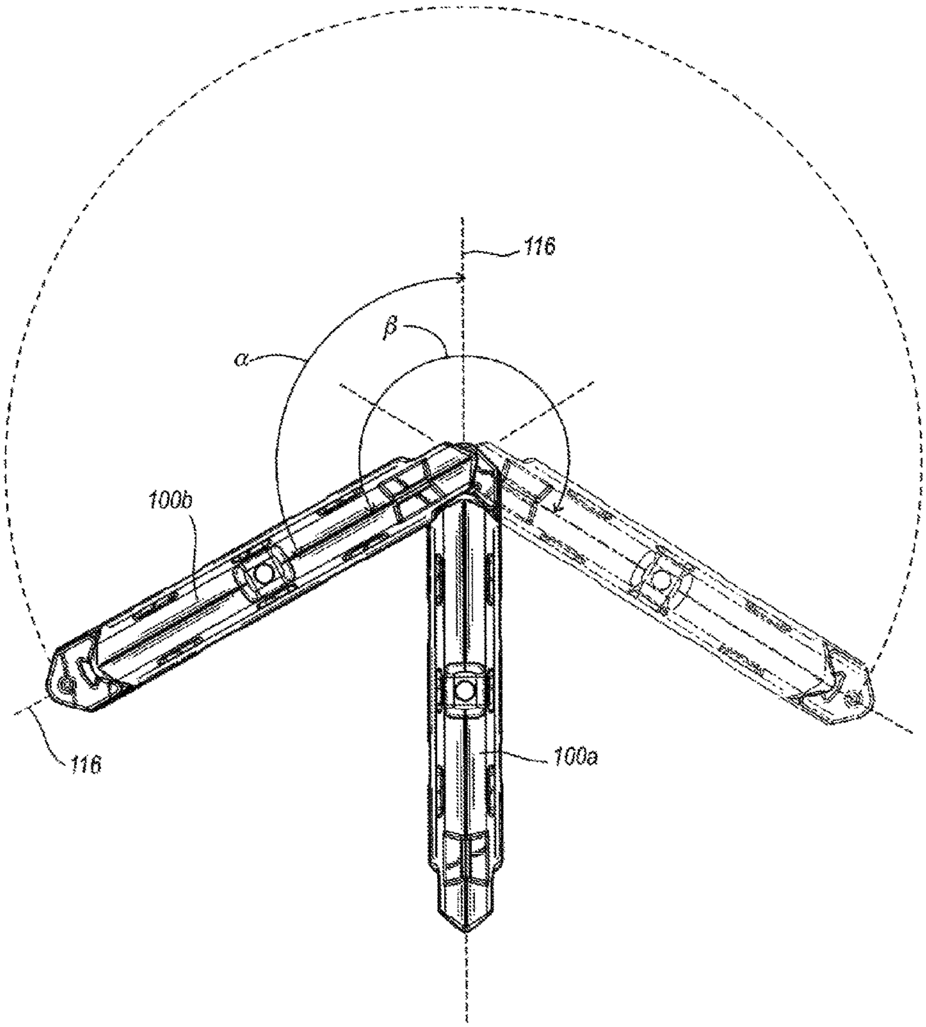
FIG. 9 is a top plan view of the coupled pair of barriers shown in FIG. 4 showing the range of angles possible when connected.

In one embodiment post 240 is designed to be rotatable within opening 280 so that barrier 100*b* can freely rotate relative barrier 100*a* about a longitudinal axis extending through post 240. This is typically accomplished by having both post 240 and opening 280 have complementary circular transverse cross-sectional configurations. However, other configurations can also be used, especially wherein opening 280 is larger than post 240. With reference to FIG. 9, with barriers 100*a* and 100*b* connected as discussed above, one of the barriers can be selectively positioned relative to the other barrier over an angle formed between the longitudinal axes 116 of the barriers. For example, the barriers can rotate relative to alignment of the central longitudinal axes 116 over an angle $\alpha$ that is typically greater than 45°, more commonly greater than 90°, and often greater than 120°. Likewise, the barriers 100*a* and 100*b* can rotate relative to each other over a maximum angle $\beta$ by an amount of at least 90°, more often at least 180°, and often greater than 240°. Other angles can also be formed. The above large angle of movement between the barriers enables a string of connected barriers 100 to be laid out in a variety of different patterns such as a continuous loop or a curved path.

Housing 102 and coupler 104 are each typically made of a resiliently deformable polymeric material having strong, semi-rigid, and energy absorbing properties. Such materials include linear or cross-linked plastics that will deform under pressure but will not fail in a brittle manner. Examples of conventional polymeric materials include polyethylene (including High Density Polyethylene (HDPE)), polyvinylchloride, nylon, polycarbonate, and polypropylene. Additives such as dyes, pigments, and reinforcements, such as fibers, can also be added to the material. Florescent dies can be added to help housing 102 and/or coupler 104 glow at night for better direction of traffic. In one embodiment, housing 102 and coupler 104 are made from a recyclable plastic such as polyethylene or HDPE. This enables old or broken barriers to be ground down and recycled into new barriers. It is appreciated that housing 102 and coupler 104 can be made from the same material or from different materials.

It is generally desirable that housing 102 has a substantially uniform thickness T, as shown in FIG. 1, so as to minimize shrink deformation. In one embodiment, housing 102 and coupler 104 each have a thickness T in a range between about 0.2 cm to about 1.5 cm with about 0.3 cm to about 0.8 being more common. The thickness is chosen to optimize desired deflection and required strength properties. Other dimensions can also be used. Coupling 104 may or may not have the same thickness as housing 102.

Barrier 100 can vary in height, width, and length. In one embodiment barrier 100 has a maximum height extending between floor 114 and top wall 126 that is typically in a range between about 10 inches to about 30 inches with about 15 inches to about 25 inches being more common. Barrier 100 has a maximum width extending between opposing side walls 122 and 124 that is typically in a range between about 8 inches to about 20 inches with about 12 inches to about 16 inches being more common. Finally, barrier 100 has a maximum length extending between the terminal ends of first and second projection portions 200 and 202 in a range between about 60 inches to about 120 inches with about 90 inches to about 100 inches being more common. Other dimensions can also be used. The size of barrier 100 is in part dictated by the intended use.

Further disclosure with regard to the design, configuration, operation and use of barrier 100 is disclosed in US Patent Publication No. US 2009/0003931, published Jan. 1, 2009 which is incorporated herein by specific reference. Furthermore, as previously mentioned, barrier 100 can have a variety of other configurations. For example, barrier 100 can have the configuration of the barriers as depicted in each of U.S. Pat. Nos. 8,939,675; 8,167,512; 7,789,585; 8,453,995; 7,922,420; and 7,275,888, which are also incorporated herein by specific reference.

Returning to FIG. 1, light assembly 106 can be attached to housing 102 as required by some government guidelines or to simply aid visibility in low light or night conditions. Light assembly 106 is configured to couple with a first coupling disposed on barrier housing 102. In one embodiment the first coupling can comprise a stem having internal or external threads, such as threaded stem 162 discussed above with regard to FIG. 3. Alternatively, the first coupling can simply comprise threads 194 or 196 disposed on or within stem 162 or housing 102 as previously discussed with regard to FIGS. 3-5. As discussed below in greater detail, the first coupling can also have a variety of other configurations.

Figure 10:
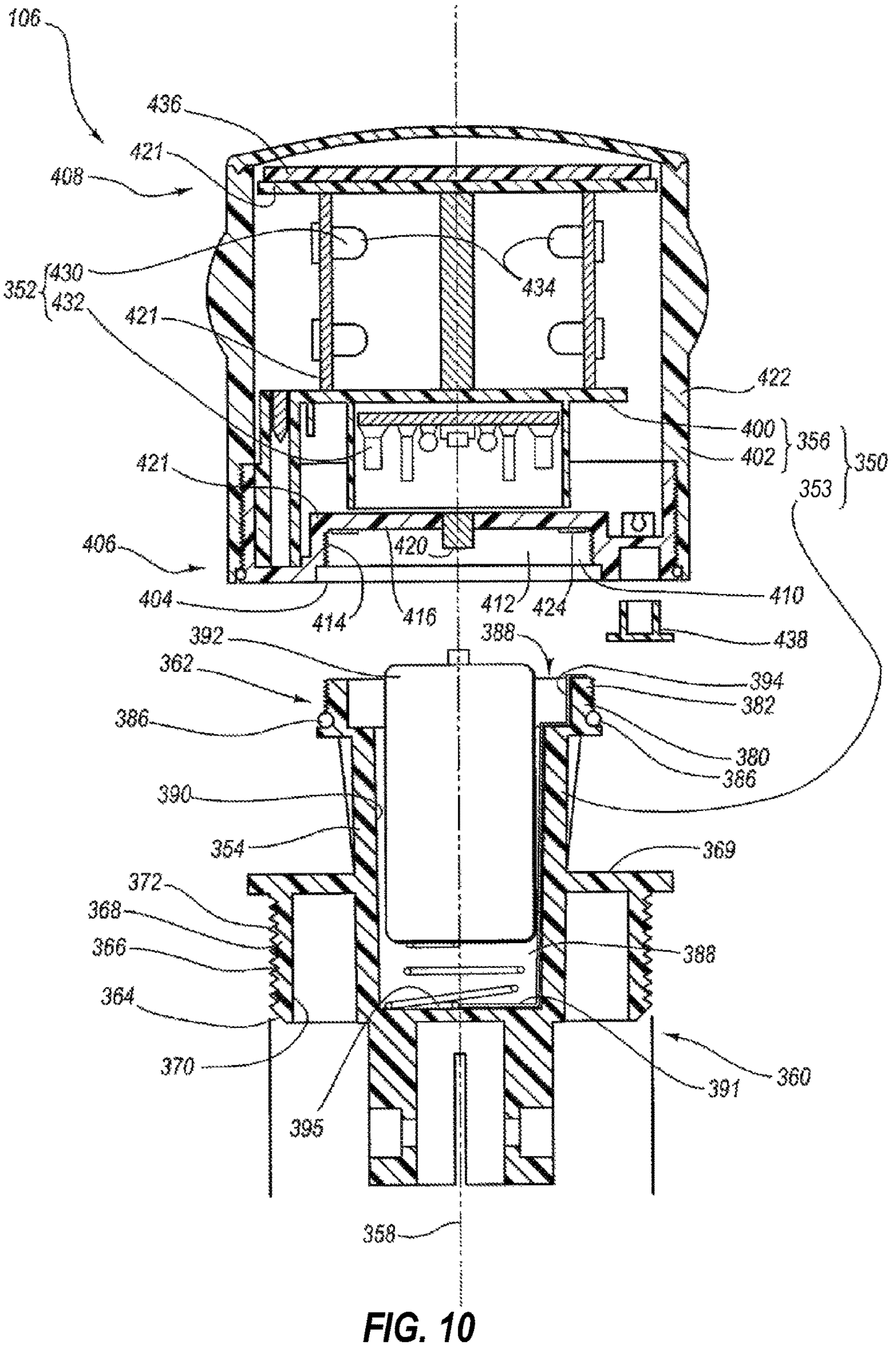
FIG. 10 is an exploded cross sectional view of a light assembly of the barrier system shown in FIG. 1.

As depicted in FIG. 10, light assembly 106 comprises a housing 350 and a light source 352 coupled with housing 350. Housing 350 is configured to couple with the first coupling on barrier housing 102.

Figure 11:
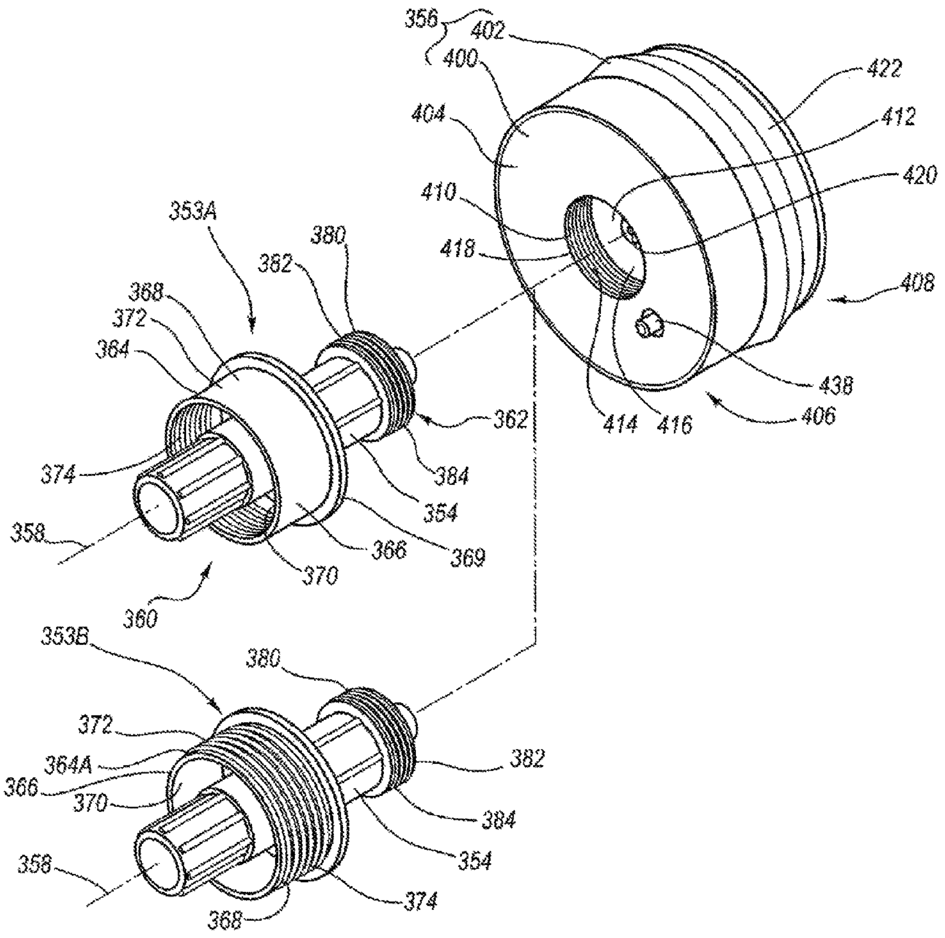
FIG. 11 is a bottom perspective view of a light assembly showing a lens assembly and two embodiments of a stem that can be used with the lens assembly.

Turning to FIG. 11 in conjunction with FIG. 10, housing 350 comprises an elongated stem assembly 353 and a lens assembly 356 mounted thereto. FIG. 11 shows two embodiments (353A and 353B) of stem assembly 353 that can be used with lens assembly 356. Stem assembly 353A comprises an elongated stem 354 having a central longitudinal axis 358 extending from a first end 360 to an opposing spaced apart second end 362. A second coupling 364 is formed on or attached to stem 354, typically at first end 360. Second coupling 364 is configured to removably secure to the first coupling formed on barrier housing 102. To this end, second coupling 364 is the mating equivalent to the first coupling.

For example, second coupling 364 comprises a cylindrical sleeve 366 having an annular sidewall 368 that encircles stem 354 and an annular flange 369 that extends between sidewall 368 and stem 354. Sidewall 368 has an inside surface 370 facing toward stem 354 and an opposing outside surface 372 facing away from stem 354. As shown in FIG. 11, a helical thread 374 is formed on inside surface 370. As a result, second coupling 364 can be selectively threaded onto threaded stem 162 (which is one embodiment of a first coupling) extending from housing 102 (FIG. 3).

Stem assembly 353B is substantially the same as stem assembly 353A (like elements being identified by like reference characters) except that stem assembly 353B comprises a second coupling 364A where threads 374 are mounted on outside surface 372 of sidewall 368. As a result of this configuration, second coupling 364A can threadedly couple with the embodiment of stem 162 depicted in FIG. 4 or threads 196 depicted in FIG. 5. It is appreciated that second coupling 364, 364A can be a separate device that is attached to stem 354 before use, or can be integrally formed as a unitary member with stem 354. Furthermore, second coupling 364, 364A can be fixed to stem 354 so that stem 354 and second coupling 364, 364A rotate concurrently or second coupling 364, 364A can be configured to independently rotate about stem 354.

A first attaching member 380 is disposed at second end 362 of stem 354. First attaching member 380 is configured to couple with lens assembly 356. As depicted, first attaching member 380 has an annular perimeter sidewall 382 encircling and facing away from longitudinal axis 358. Perimeter sidewall 382 has a helical thread 384 formed thereon. A gasket, washer, O-ring, or the like, such as O-ring 386, can also be mounted on attaching member 380 so as to provide a substantially watertight connection.

Returning to FIG. 10, stem 354 bounds a bore 388 extending into stem 354 along longitudinal axis 358 from second end 362. In the depicted embodiment, bore 388 extends from second end 362 of stem 354 toward first end 360 and is bounded by an interior sidewall 390 and an end wall 391. Bore 388 is sized so that one or more batteries 392, such as rechargeable batteries, can be inserted therein. A metal spring 395 is mounted on end wall 391 so as to facilitate electrical contact with battery 392. An electrical contact 394 extends from spring 395 to the mouth of bore 388 to bring battery 382 into electrical contact with light source 352 when stem 354 is coupled with lens assembly 356.

Lens assembly 356 comprises a lens housing 400 in which light source 352 is disposed and a lens 402 mounted to lens housing 400. Lens housing 400 extends from a first end face 404 at a first end 406 to a spaced apart second end 408. Disposed at first end 406 of lens housing 400 is a second attaching member 410, configured to couple with first attaching member 380 disposed on stem 354.

As shown in FIG. 11, second attaching member 410 comprises a threaded bore 412 extending from first end face 404 toward second end 408 of lens housing 400. Bore 412 is bounded by a perimeter sidewall 414 and an end wall 416. A helical thread 418 is formed on perimeter sidewall 414 so as to correspond to the helical thread 384 formed on first attaching member 380. This allows first attaching member 380 to threadedly engage second attaching member 410.

Mounted on end wall 416 of threaded bore 412 is a centrally disposed electrical contact 420 that biases against the battery 392 and an annular electrical contact 424 that encircles electrical contact 420 and biases against electrical contact 394 when stem 354 couples with lens assembly 356. In this manner, battery 392 can electrically communicate with light source 352.

To couple lens assembly 356 and stem 366 together to form light assembly 106, lens assembly 356 and stem 366 are aligned along longitudinal axis 358 so that first attaching member 380 and second attaching member 410 adjoin one another. First attaching member 380 is then coupled to second attaching member 410 by rotating stem 366 relative to lens assembly 356 so that thread 384 on first attaching member 380 engages thread 418 on second attaching member 410.

It is appreciated that other types of attaching members can alternatively be employed to attach stem 354 to lens assembly 356. For example, instead of first attaching member 380 of stem 354 screwing into second attaching member 410 of lens assembly 356, the attachment mechanisms can be switched so that lens assembly 356 can include a stem that screws into a bore on stem 354. Other types of attaching members as are known in the art can also be used.

Lens 402 is disposed on lens housing 400 so as to protect light source 352 while allowing light emanating from light source 352 to shine therethrough. In the depicted embodiment, lens 402 has a substantially cylindrical sidewall 422 covering lens housing 400 so as to extend from first end 406 to second end 408 of lens housing 400. Lens 402 is attached to lens housing 400 such that lens housing 400 is covered by lens 402 except for first end face 404. Lens 402 is typically comprised of a translucent material, such as glass, plastic, or the like. Other translucent materials can also be used, as is known in the art. Lens 402 can be clear or tinted, such as tinted red or other colors, or can be a combination of the two.

Figure 12:
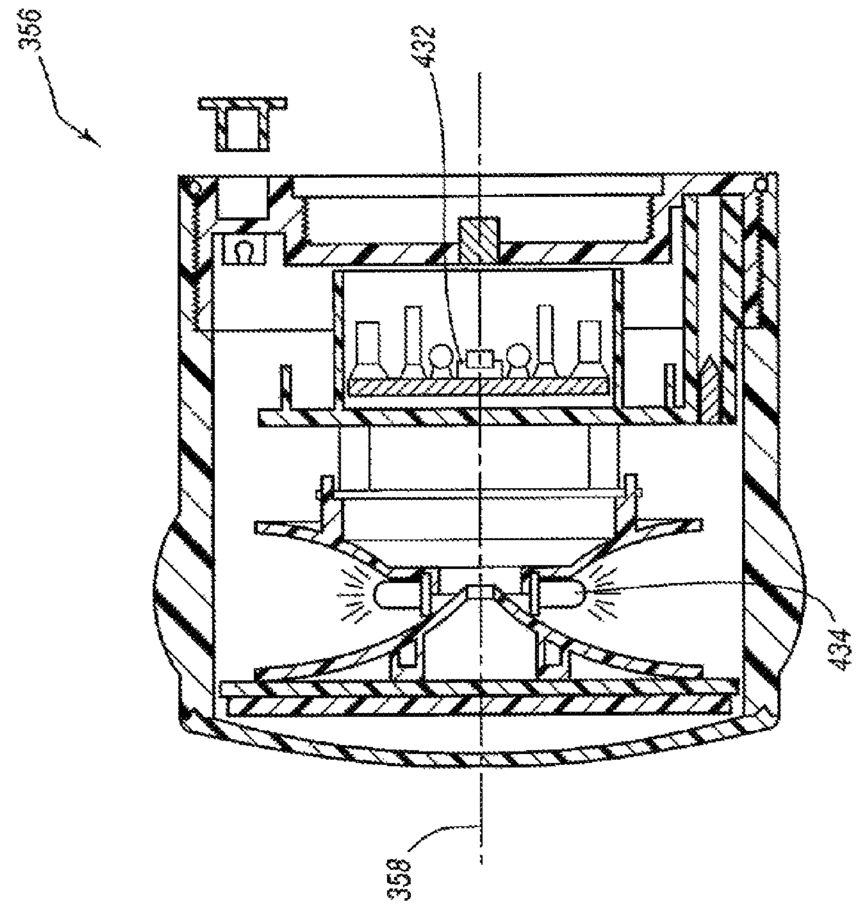
FIG. 12 is a cross sectional view of an alternative embodiment of a lens assembly of the light assembly according to the present invention.

As shown in FIG. 10, light source 352 comprises a light emitting device 430 and circuitry 432 which in part delivers power and controls light emitting device 430. Light emitting device 430 and circuitry 432 are attached or otherwise mounted to lens housing 400. Light emitting device 430 comprises electric or electronic components that emit light when energized. In the depicted embodiment, light emitting device 430 comprises one or more light emitting diodes (LEDs) 434 situated to provide light that will shine through lens 402. In the embodiment depicted in FIG. 10, LEDs 434 are arranged so as to be facing generally toward longitudinal axis 358. It is appreciated that other arrangements of LEDs 434 can alternatively be used. For example, FIG. 12 shows an alternative embodiment in which the LEDs 434 are facing generally away from longitudinal axis 358. Other arrangements can also be used. It is appreciated that other types of light emitting devices can alternatively be used, such as incandescent light bulbs, fluorescent light bulbs, or the like, as is known in the art. LEDs 434 are selectively controlled by circuitry 432 that is electrically connected thereto.

Returning to FIG. 10, circuitry 432 controls LEDs 434 to selectively emit light based on the circuitry composition, as is known in the art. As discussed below in further detail, circuitry 432 can comprise electronic circuitry, as is known in the art, such as resistors, capacitors, integrated circuits, microcontrollers, non-transitory memory, computer processors and the like.

A power source is also included to provide power to circuitry 432. As noted above, one method of supplying power for circuitry 432 is via battery 392 disposed in bore 388 of stem 366. Power is transferred from batter 392 to circuitry through electrical contacts 394 and 420 disposed respectively on stem 366 and lens housing 400. In other embodiments, battery 392 can be disposed within lens housing 400.

A recharging source can also be included in the present invention. For example, in the depicted embodiment, a solar cell 436, as is known in the art, is disposed at second end 408 of lens housing 400. Solar cell 436 is covered by a portion of lens 402 so as to be protected and is situated so as to receive the rays of the sun during the daytime. An electrical connection between solar cell 436 and battery 392 is provided so that solar cell 436 can charge battery 392 during daylight hours. A switch 438 can also be provided to turn the light source on and off. Switch 438 is connected so as to allow current from the battery 392 or other power source to flow to circuitry 432 when in a first position and to prevent current to flow to circuitry 432 when in a second position, as is known in the art.

Figure 13:
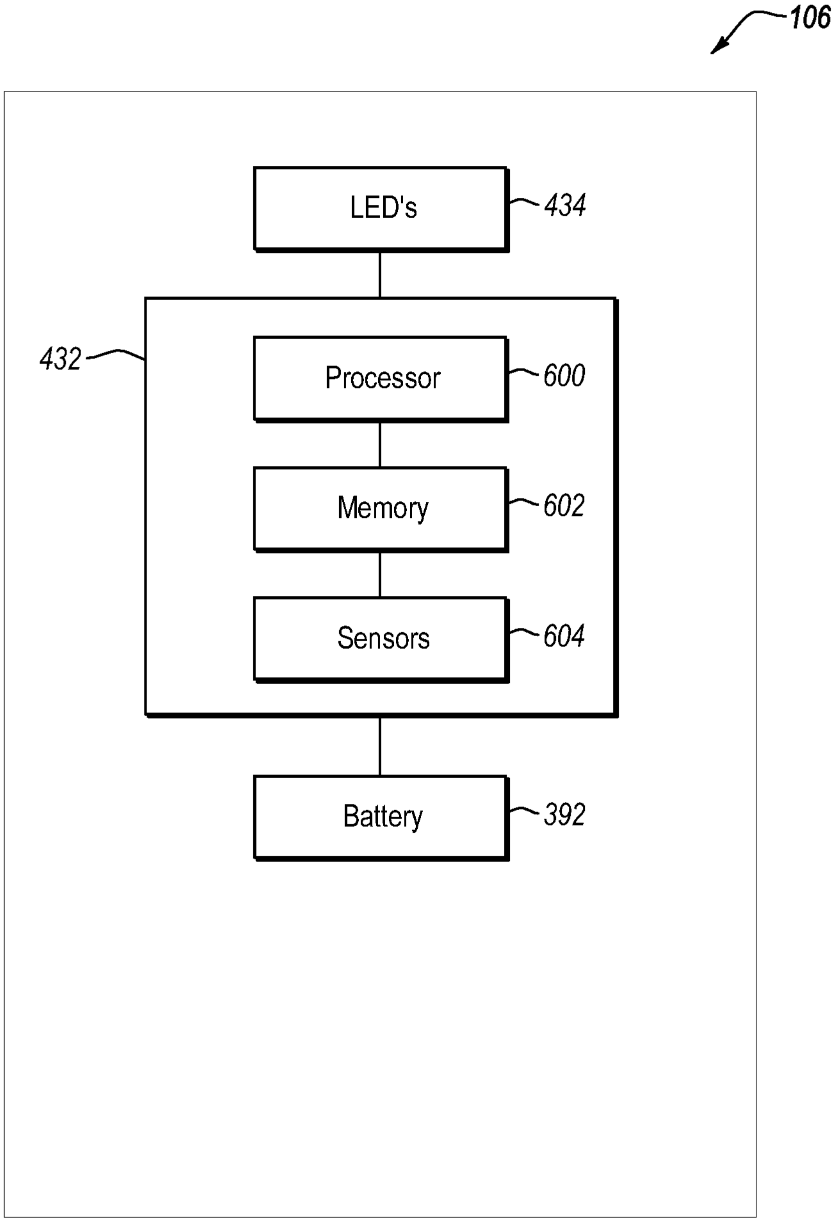
FIG. 13 is a schematic of one embodiment of the light assembly shown in FIG. 10.

Depicted in FIG. 13, is one schematic representation of light assembly 106 where circuitry 432 is shown as comprising a programmable processor 600 which uses memory 602. Memory 602 can comprise non-transitory memory such as the computer storage media previously discussed herein. Processor 600 can be programmed at the time of manufacture of light assembly 106 to customize the operation of LEDs 434 or other light emitting devices. For example, circuitry 432 can be programmed to cause LEDs 434 to continuously emit light or periodically blink on and off. Likewise, circuitry 432 can be used to customize the blink rate and brightness of LEDs 434 and can cause the LEDs 434 to be energized together or at separate intervals. Thus, memory 602 can be loaded with executable code that when executed by processor 600, processor 600 can control LEDs 434 to perform the above functions. Circuitry 432 can also include sensors 604 to determine various operating conditions. For example, sensor 604 can comprise a light detector that can be set to detect the amount of ambient light present so that LEDs 434 are only energized by battery 392 when the ambient light is lower than a predetermined amount, thus saving power.

Figure 14:
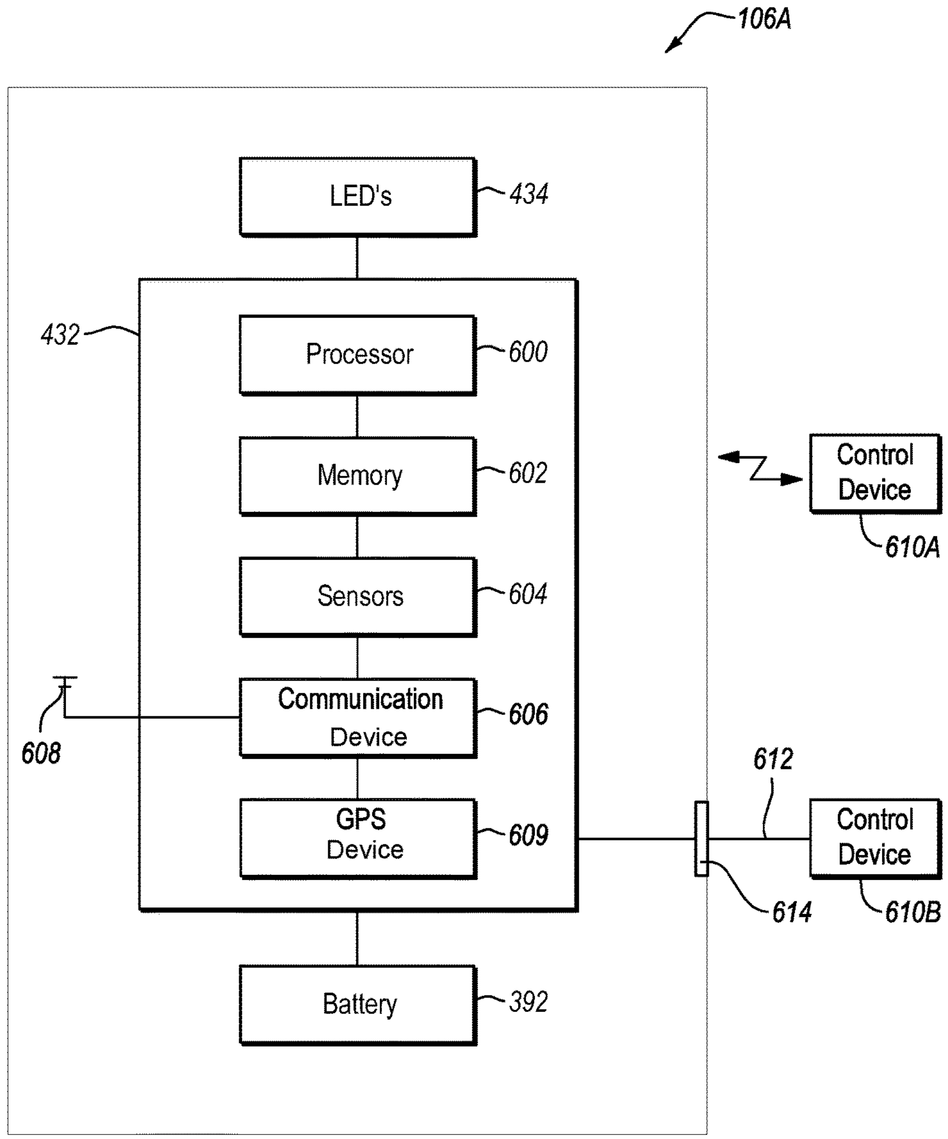
FIG. 14 is a schematic of an alternative embodiment of the light assembly shown in FIG. 10 having a communication device and a GPS device.

As discussed above, in one embodiment circuitry 432 can be programmed at the time manufacture and then unaltered thereafter, i.e., the program can be set for a fixed use. However, depicted in FIG. 14 is an alternative embodiment of a light assembly 106A where circuitry 432 is configured and programmed to be interactive during operation of light assembly 106A. Like elements between light assembly 106 and light assembly 106A are identified by like reference characters. In contrast to light assembly 106, light assembly 106A includes a communication device 606 as part of circuitry 432. Communication device 606 is electrically coupled with processor 600 and is configured to transmit data received from processor 600 or other circuitry 432 and to receive and forward data to processor 600 or other circuitry 432. In one embodiment, communication device 606 can comprise one or more transceivers and/or one or more separate transmitters and receivers. Other communication devices can also be used. Communication with communication device 606 can be accomplished wirelessly through a control device 610A. In this embodiment, communication device can transmit and receive data through an antenna 608. The wireless communication can be through any wireless technology such as Wi-Fi, cellular data service, Bluetooth, radio frequency (RF), optical communication including infrared and laser, mobile satellite communication, and the like.

In other embodiments, a control device 610B can communicate with communication device 606 though a cable 612 extending from control device 610B and removably coupling with communication device 606 through a port 614. Examples of control devices 610 that can be used include laptop computers, cellular smartphones, tablet computers, desktop computers, specialty computers and other computers. Control devices 610 can communicate with communication device 606 either directly or through any available networks such as the Internet, cellular networks, satellite networks, local area networks (LAN), wide area network (WAN), combinations of the foregoing and other available networks.

Figure 15:
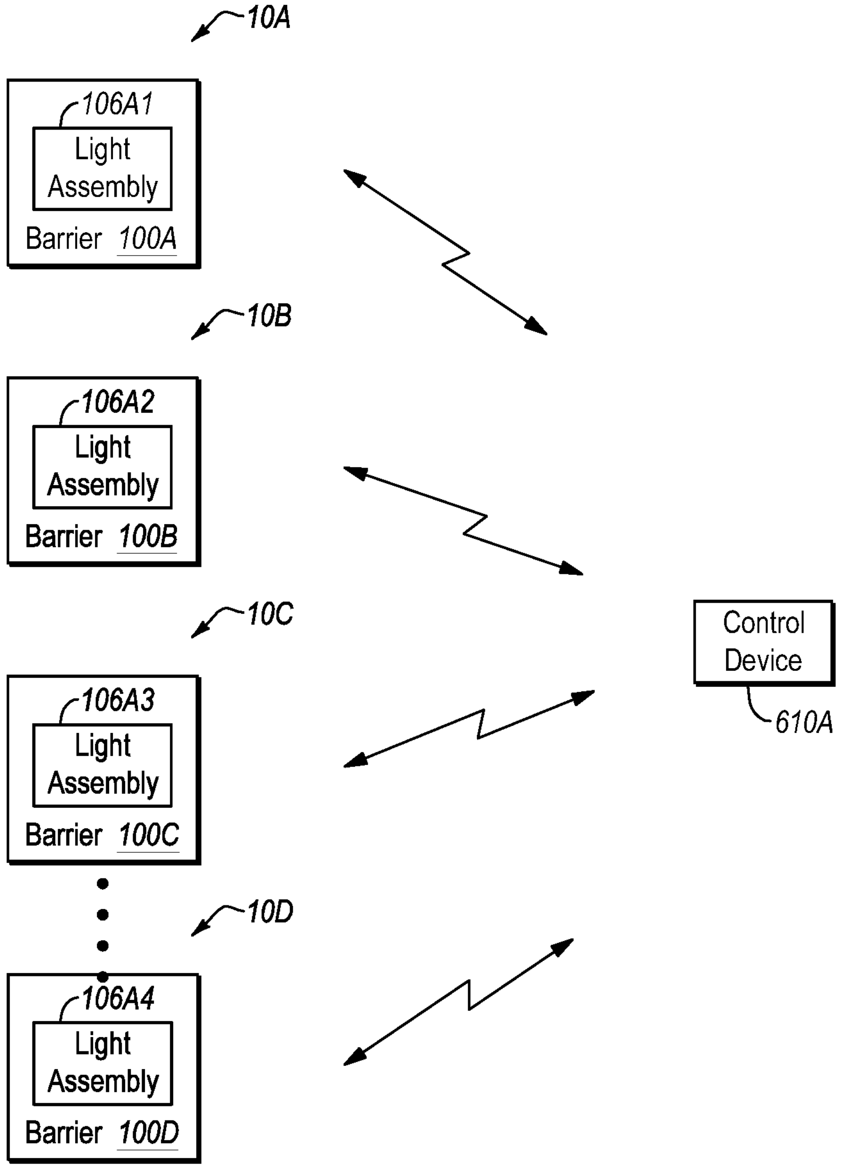
FIG. 15 is a schematic showing a plurality of barrier systems communicating wirelessly with a control device.

The ability to have ongoing interactive communication with light assembly 106 through control device 106 enables barrier systems 10 to be used in a number of unique applications. For example, as also depicted in FIG. 14, circuitry 432 of light assembly 106A can include a global positioning system (GPS) device 609 that can use GPS to determine the location, i.e., GPS coordinates, of light assembly 106A. That information can then be transmitted through communication device 606 to control device 10. As depicted in FIG. 15, any number of separate barrier assemblies 10, represented by depicted barrier assemblies 10A-10D, can be placed at a desired location and in a desired orientation for use. By way of example, the number of grouped barrier assemblies can include at least 2, 4, 6, 8, 10, 20, 40 or more. Each barrier assembly 10A-10D includes a barrier 100A-100D and a corresponding light assembly 106A1-106A4. By having each light assembly 106 transmit its GPS coordinates to control device 610A, the position and orientation of each barrier assembly 10A-10D can be positioned on a physical or digital grid, map, or other surface for plotting.

For example, barrier assemblies 10A-10D are commonly used for directing traffic and/or restricting access of pedestrians, automobiles and aircraft. As such, during use barrier assemblies 10A-10D can be positioned at constructions zones; restricted zones; entertainment and athletic events; roadways and parking lots that are being repaired, constructed or detoured; and at airport runway, taxiways, and gate areas that are being repaired, constructed or detoured. There are also other areas where barrier assemblies 10A-D can be used. Once barrier assemblies 10A-10D are positioned and orientated at a desired location, such as one of the above, the GPS coordinates for each barrier assembly can be transmitted wirelessly or otherwise over a network to a remote control device 610A. By plotting the coordinates on a map, grid or other surface, a remote monitoring person can ensure the barrier assemblies 10A-10D are properly positioned and orientated, can direct and monitor movement of one or more of barrier assemblies 10A-10D, and can ensure that no barrier assemblies 10A-10D have been improperly removed, positioned, or stolen. In contrast to using GPS, it is appreciated that light assemblies 106 and control devices 610 can use other established technologies to remotely locate and plot the position of barrier assemblies 10A-10D. For example, radio frequency transmissions utilizing high frequency, very-high frequency, short-wavelength ultra-high frequency (such as Blue Tooth), radar, or laser technologies can be used to plot and provide geo-spatial recognition and/or broadcasting capability. In one embodiment, it is envisioned that light assemblies 106A1-106A4 communicate their position to one another and then use either GPS or cell phone signals to identify their position for plotting.

In addition to tracking location and movement of barrier assemblies 10, control devices 610 can be used to continuously or periodically monitor and/or adjust an operational property or performance of light assemblies 106. For example, sensors 604 can comprise operation sensors that monitor that LEDs 434 and/or other aspects of light assembly are properly working. Information that a light assembly 106 is working and/or not working can be transmitted to control 610 by each communication device 606 for remote monitoring on control device 610. In other embodiments, sensors 604 can comprise temperature sensors that can be used for measuring the temperature at each light assembly 106. Thus, light assemblies 106 can assist in the remote monitoring of the environment at different light assemblies 106 and can also be used to determine when the temperature is potentially too high or too low for proper operation of light assemblies 106. Other sensors 604 that could be used include motion sensors, such as sensors that detect when a barrier is moving or sensors that detect when something next to the barrier is moving, moisture sensors and wind sensors. Moisture sensors, temperature sensors, and wind sensors are examples of environmental sensors.

In addition, control devices 610 can periodically communicate with one or each of light assembly 106 through communication device 606 to adjust the blink rate of LED's 434, adjust the illumination intensity of LEDs 434, switch LEDs 434 between continuously emitting light and periodically blinking on and off and control when LEDs 434 start and stop operation. Different LEDs 434 within each light assembly 106 can also be designed to emit a different light color. For example, a single light assembly 106 can have or can have at least 2, 3, 4, 5, or more LEDs that each emit a different color such as red, green, blue or other colors. As such, control device 610A can also be used to switch which LEDs are in operation and thus switch the color that is being illuminated from each light assembly 106.

Furthermore, by selectively combining the light from multiple LEDs within a single light assembly 106, the light assembly 106 can be used to emit a further variety of different colors. Specifically, as depicted in FIG. 14, LEDs 434 can comprise three separate LEDs where one emits red, one emits green and one emits blue. Processor 600 can be used to control which LED 434 is on and the intensity at which the light is being emitted. For example, the intensity can be set at any value between 0% where the LED is turned off up to 100% where the LED is shining with its maximum intensity. For example, each barrier can be set to operate at an intensity of at least or less then 10%, 20%, 30%, 40%, 50%, 60%, 70%, 80% or 90%. There are two methods for processor 600 to modify the intensity of any LED. One method is called "Pulse Width Modulation" (PWM) while the other is "Constant Current" driver (CC driver).

By simultaneously operating two or more of the LEDs 434, the different colors of the LEDs mix to form new colors. For example, simultaneously shining each of the red, green and blue LEDs each at a 100% intensity results in pure white; shining red and blue at 100% intensity while green is at 0% intensity results in purple; and shining red at 50% intensity, green at 40% intensity and blue at 0% intensity results in yellow. Accordingly, by selecting LEDs having desired colors and then combining the different LEDs at different intensities, such as the percentages discussed above, light assemblies 106 can be used to emit any desired color. To optimizing mixing of the colors, it is desirable to have the different LEDs placed close together. By using the above, control device 610 can communicate with processor 600 to selectively set or change the color that is emitted from each light assembly 106.

LEDs 434 can also be used that emit infrared light. The use of infrared light can have military and other applications where it is only desirable to see the light at night through infrared goggles.

In addition to the above, control devices 610 can be used to synchronize when the LEDs or other light emitting devices of light assemblies 106 turn on and off relative to each other. For example, when barrier systems 10 are aligned or set along a path, having the LEDs 434 of each light assembly 106 turn on and off in progressive succession from first to last along the path and then start over, the lighted LEDs 434 form a flashing, directional path. Here is it noted that device 610 can be used to program circuitry 432 of each light assembly 106 for synchronization based on time intervals or control device 610 can program each light assembly to communicate wirelessly with a consecutive light assembly 106 so that LEDs 434 flash based upon when the prior LEDs flashed. Other mechanism can also be used. In view of the above, it is appreciated that the inventive interactive light assemblies 106 used in combination with barriers 100 provide a number of unique benefits over conventional static barrier systems.

Different methods for coupling light assembly 106 to barrier 100 are now given. First, light assembly 106 is assembled as discussed previously. Light assembly 106 is then positioned above inlet port 157 (FIG. 3) of barrier 100 so that longitudinal axis 358 of light assembly 106 aligns with radial center 188 of inlet port 157. Light assembly 106 is lowered until second coupling 364 contacts with a first coupling such as stem 162 form on housing 102. Light assembly 106 is then rotated in a particular direction relative to barrier 100, causing thread 374 on second coupling 364 to engage thread 194 or 196 (FIGS. 3-5) of first coupling. Continue rotation of light assembly 106 in the same direction tightens the threaded connection, securing light assembly 106 to barrier 100.

To remove light assembly 106 from barrier 100, light assembly 106 is simply unscrewed from barrier 100. To do this, light assembly 106 is rotated in the opposite direction as when tightening, which causes the threaded connection to loosen until the threads 374 and 194 or 196 are separated.

The inventive light assembly provides unique benefits in that it enables the light assembly to be easily mounted on the barrier by hand without the need of fasteners, such as bolt, screws, or clamps, and because it does not require the use of a separate tool for attaching. However, if it is desired to further secure the light assembly to the barrier, separate fasteners or locks can be used. Furthermore, by coupling the light source with the inlet port, the light source eliminates the need for a separate cap, thereby reducing cost and the need for extra parts.

Figure 16:
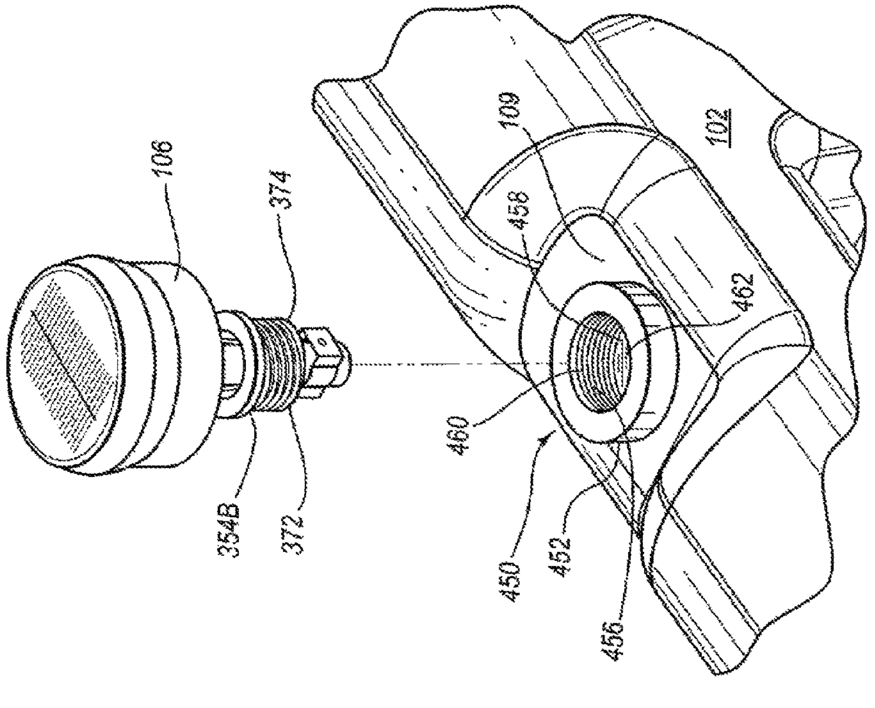
FIG. 16 is a top perspective view of the light assembly of FIG. 10 and a corresponding first coupling, in an uncoupled state, according to the present invention.

Depicted in FIGS. 16-20 are various alternative embodiments of means for mounting the light assembly to the barrier by rotation of the light assembly relative to the barrier. Like elements between the alternative embodiments and the previously discussed embodiments are identified by like reference characters. In FIG. 16, an alternative embodiment of a first coupling 450 is depicted. First coupling 450 comprises an annular stem 452 outwardly projecting from exterior surface 109 of housing 102. Stem 452 has an inside surface 456 that bounds an opening 458. A thread 460 is formed on inside surface 456. In contrast to inlet port 157 (FIG. 3), opening 458 does not extend through housing 102 so as to communicate with internal chamber 110. That is, first coupling 450 is not a part of an inlet port used to fill up barrier 100 with ballast. Instead, opening 458 is bounded by an end wall 462 so as to form a closed socket or blind hole. Light assembly 106 can couple with stem 452 in a similar fashion as described above with respect to stem 162. That is, helical thread 374 formed on outside surface 372 of sleeve 366 (FIG. 11) can engage threaded inside surface 456 of stem 452. It is appreciated that stem 453 can be located at any location on barrier 100. It is also appreciated that stem 452 can be formed with threads on the exterior surface thereof for engagement with light assembly 106.

Figure 17:
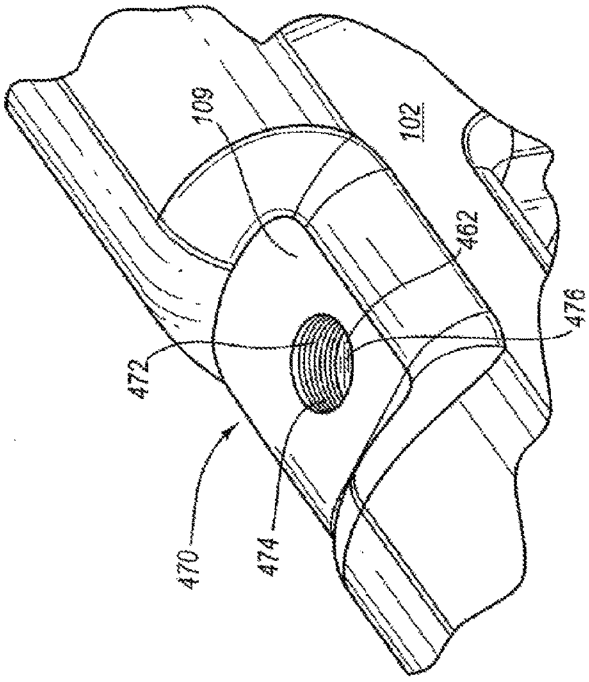
FIG. 17 is a top perspective view of an alternative embodiment of a first coupling according to the present invention.

In FIG. 17, another alternative embodiment of a first coupling 470 is depicted. First coupling 470 is similar to first coupling 450 except that first coupling 470 does not have a stem. Instead, first coupling 470 comprises a thread 472 formed on an inside surface 474 formed directly in housing 102. Inside surface 474 bounds an opening 476 that terminates at end wall 462 so as to form a closed socket. Light assembly 106 can couple with first coupling 470 in a similar fashion as described above with respect to first coupling 450. That is, helical thread 374 formed on outside surface 372 of stem 354B (FIG. 11) can engage threaded inside surface 474 of housing 102. Again, first coupling 470 can be formed at any location on barrier 100.

Figure 19:
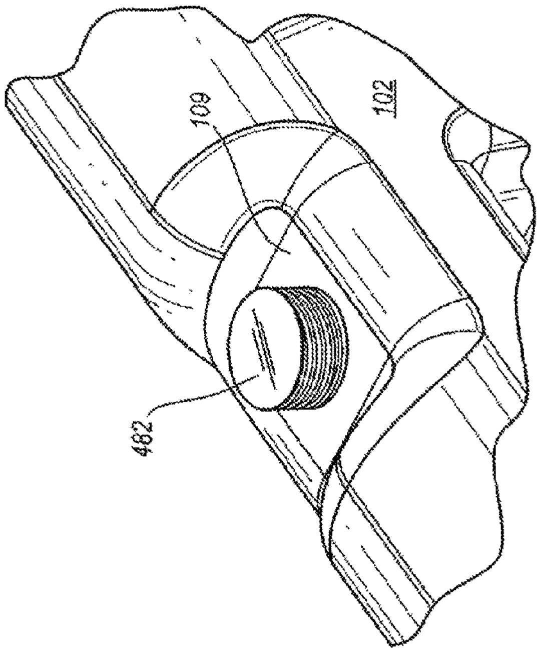
FIG. 19 is a top perspective view of another alternative embodiment of a first coupling according to the present invention.
Figure 18:
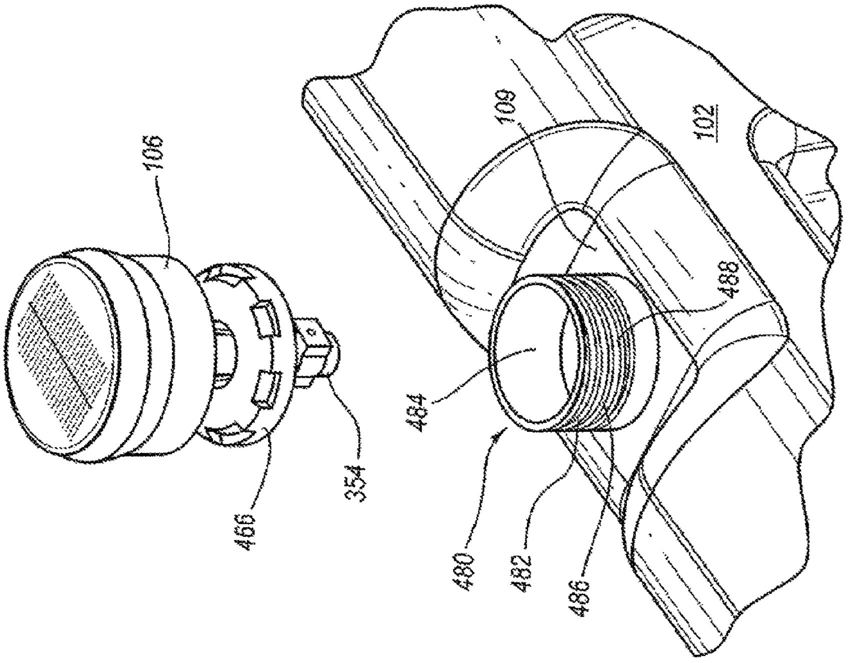
FIG. 18 is a top perspective view of an alternative embodiment of a light assembly and corresponding first coupling, in an uncoupled state, according to the present invention.
Figure 21:
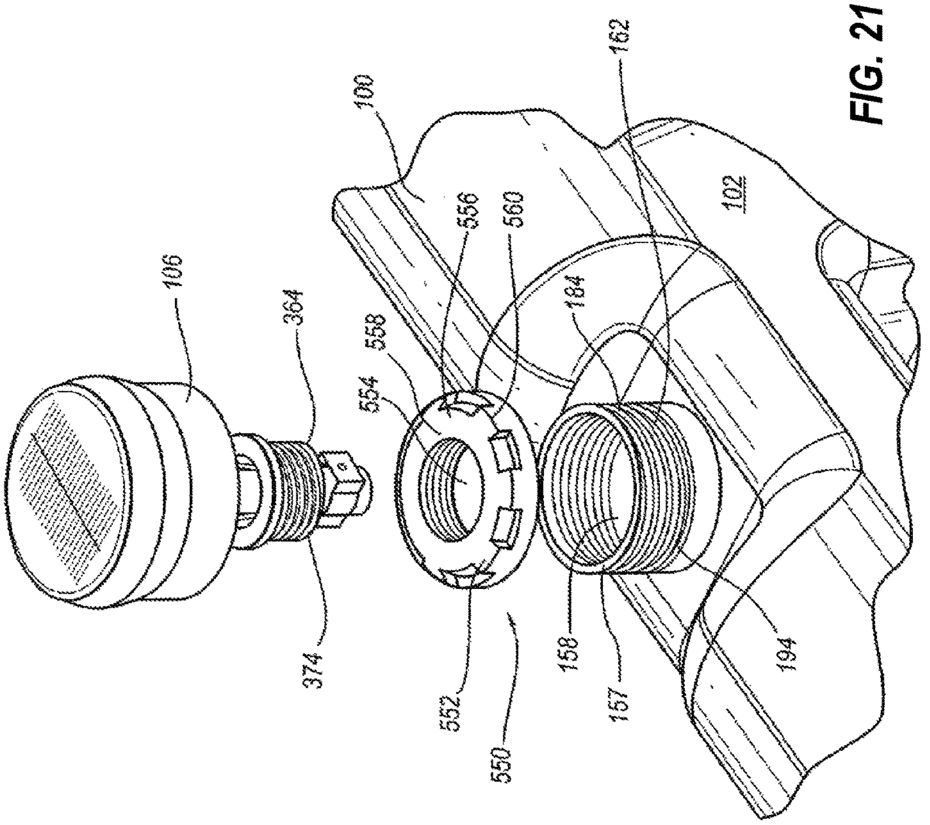
FIG. 21 is a top perspective view of the light assembly of FIG. 10, an adapter, and a corresponding inlet port, in an uncoupled state.
Figure 22:
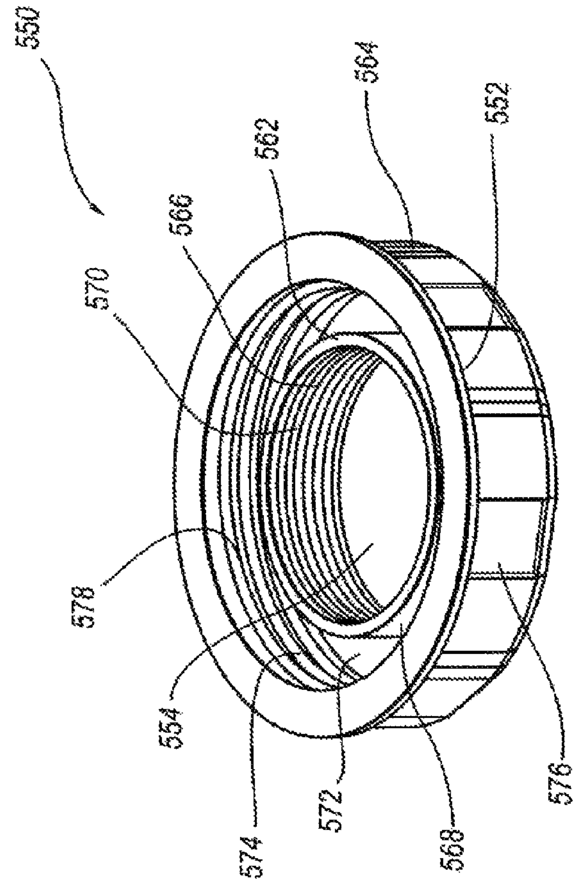
FIG. 22 is a bottom perspective view of the adapter shown in FIG. 21.

FIGS. 18 and 19 depict alternative embodiments of the first coupling in which threads are disposed on the outer surface of the first coupling. For example, in FIG. 18, a first coupling 480 comprises a stem 482 outwardly projecting from exterior surface 109 of housing 102, bounding an opening 484, similar to first coupling 450. In contrast to thread 460 being formed on inside surface 456 of stem 452, however, thread 486 is formed on an outside surface 488 of stem 482. Light assembly 106 can couple with stem 482 in a similar fashion as described above with respect to stem 162. That is, helical thread 374 formed on inside surface 370 of stem assembly 354A (FIG. 11) can engage threaded outside surface 488 of stem 482. Alternatively, as shown in FIG. 18, a second coupling 446 can be rotatably mounted on stem 354. A flange (not shown) outwardly projects from stem 354 below second coupling 446 to prevent second coupling 446 from sliding off of stem 354. Second coupling 446 comprises a threaded cap that can be screwed onto stem 482 while stem 354 remains stationary, thereby securing light assembly 106 to housing 102. As shown in FIG. 21, stem 482 can alternatively be solid or at least not have an opening extending down from the top thereof.

As noted above, the alternatives shown in FIGS. 16-19 correspond to first couplings that are not used in conjunction with filling the barrier with a ballast. As a result, the stems and openings associated with first couplings 450, 470, and 480 can be sized differently than stem 162 and inlet port 157 (FIG. 3) that is used to fill barrier 100 with ballast. That is, the size of the first couplings that are only used to secure a light source can be a different size than the couplings or ports used to receive ballast. In some embodiments, openings 458, 476, and/or 484 associated with first couplings 450, 470, 480 are smaller than inlet port 157. In other embodiments, openings 458, 476, and/or 484 are larger than inlet port 157.

Figure 20:
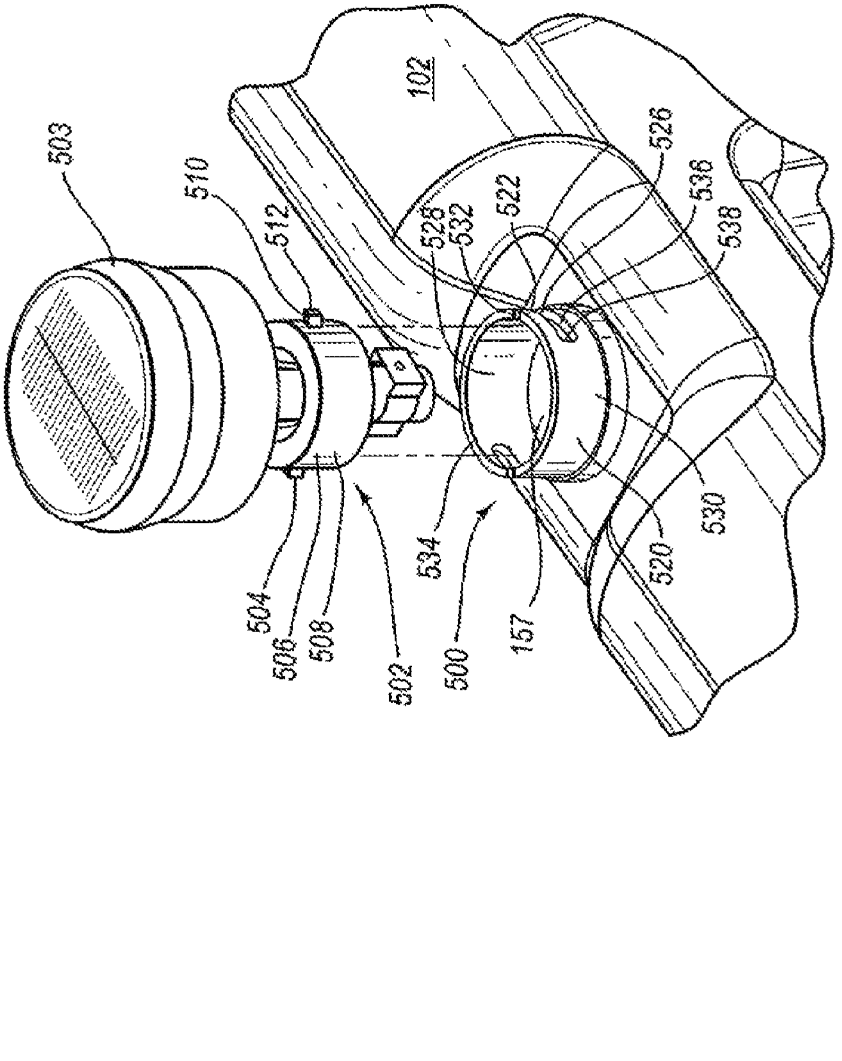
FIG. 20 is a perspective view of an alternative embodiment of a light assembly and corresponding inlet port, in an uncoupled state, according to the present invention.

In FIG. 20, another alternative embodiment of means for mounting the light assembly to the barrier is depicted. A first coupling 500 disposed on barrier housing 102 and a second coupling 502 disposed on a light assembly 503 are configured to mate together using a bayonet connection. Second coupling 502 is similar to second coupling 364, except that instead of a thread 374 disposed on the inside surface 370 or outside surface 372 of sidewall 368, second coupling 502 includes one or more bayonet prongs 504 outwardly projecting from outside surface 506 of sidewall 508. In the depicted embodiment two bayonet prongs 504 are formed on sidewall 508 so as to be diametrically opposed to one another. In other embodiments a single prong 504 can be used. In still other embodiments three or more prongs can be used. Each prong 504 has a perimeter wall 510 that extends from outside surface 506 to an end face 512.

First coupling 500 is similar to first coupling 184, except that instead of a thread 194 disposed on the inside surface 190 or outside surface 192 of stem 452, first coupling 500 includes one or more bayonet slots 522 disposed on stem 520. Each slot 522 is configured to receive and secure a separate bayonet prong 504. Each slot 522 is bounded by a perimeter wall 526 extending through stem 520 between inside surface 528 and outside surface 530. Slot 522 has a mouth 532 at a rim 534 of stem 520 and forms a substantially L-shaped channel 536 having an end position 538 at the end of the channel. Slot 522 is shaped and sized so as to allow bayonet prong 504 disposed on second coupling 502 to be received therein and become secured within slot 522 by rotating second coupling 502 relative to first coupling 500. This type of connection is known as a "bayonet connection" in the art. Two bayonet slots 522 are used in the depicted embodiment, positioned to receive the two bayonet prongs 504 formed on second coupling 502. Although two slots 522 are shown, one or three or more slots 522 can alternatively be used to match the number of prongs 504.

To secure first and second couplings 500 and 502 together, light assembly 503 is positioned above barrier 100 so that prongs 504 of second coupling 502 are positioned over slot mouths 532 of first coupling 500. Light assembly 503 is lowered so that prongs 504 are received within channels 536. Light assembly 503 is then rotated relative to barrier 100 to move prongs 504 to the end position 538 of the channel 536, securing light assembly 503 to barrier 100.

As depicted, first coupling 500 is associated with inlet port 157, similar to first coupling 184. In other embodiments, first coupling 500 is not associated with inlet port 157 and instead has an end wall, similar to alternative embodiments discussed previously.

Also, although the bayonet connection depicted in FIG. 20 discloses bayonet prongs 504 formed on second coupling 502 and bayonet slots 522 formed in first coupling 500, it is appreciated that this can be reversed. That is, in one embodiment bayonet prongs 504 are formed on first coupling 500 of barrier housing 102 and bayonet slots 522 are formed in second coupling 502 of light assembly 503.

FIG. 21 discloses an alternative embodiment of means for mounting the light assembly 106 to barrier 100 using an adapter 550 between the first and second couplings. This embodiment can be used, for example, when inlet port 157 has a greater diameter than the outside surface 372 of second coupling 364. As shown in FIGS. 23 and 24, adapter 550 comprises a body 552 encircling and bounding an opening 554. Body 552 comprises an annular top wall 556 extending between an annular inner edge 558 and an annular outer edge 560. Body 552 further comprises an inner sidewall 562 and an outer sidewall 564 extending downward from top wall 556.

Inner sidewall 562 extends downward from top wall 556 at inner edge 558 so as to encircle opening 554. Inner sidewall 562 comprises an inner surface 566 which defines opening 554 and an opposing outer surface 568 facing away from opening 554. A helical thread 570 is formed on inner surface 566 of inner sidewall 562. Thread 570 is configured to be the mating equivalent of thread 374 formed on second coupling 364 of light assembly 106.

Outer sidewall 564 extends downward from top wall 556 at outer edge 560 so as to form an annular channel 572 between inner and outer sidewalls 562 and 564. Outer sidewall 564 comprises an inner surface 574 facing toward inner sidewall 562 and an opposing outer surface 576 facing away from inner sidewall 562. A helical thread 578 is formed on inner surface 574 of outer sidewall 564. Thread 578 is configured to be the mating equivalent of thread 194 formed on stem 162 of barrier 100.

To couple light assembly 106 to barrier 100 using adapter 550, light assembly 106 is first coupled to adapter 550 by threadedly engaging thread 374 of second coupling 364 to thread 570 formed on inner sidewall 562 and rotating light assembly 106 relative to adapter 550. The coupled light assembly/adapter is then coupled to barrier 100 by threadedly engaging thread 578 formed on outer sidewall 564 of adapter 550 to thread 194 of stem 162 and rotating the coupled light assembly/adapter relative to barrier 100. Alternatively, adapter 550 may first be coupled to barrier 100 before light assembly 106 is coupled to adapter 550. In that embodiment, adapter 550 is coupled to barrier 100 as described above, except without light assembly 106 being coupled thereto. After adapter 550 has been coupled to barrier 100, light assembly 106 is then coupled to adapter 550 as described above.

It is appreciated that other alternative embodiments using adapters are also possible. For example, in one embodiment, instead of thread 578 being formed on inner surface 574 of outer sidewall 564, thread 578 is formed on outer surface 576 of outer sidewall 564 so as to be able to couple with a first coupling having a thread formed on an inside surface (see, e.g., FIG. 4). Adapter 550 can also be configured to be used with a bayonet connection.

In view of the foregoing, it is appreciated that various embodiments of the present invention have a number of unique benefits. For example, select embodiments can be easily produced by blow molding and allow a separate and discrete coupler to be used in coupling two barriers together. By doing so, manufacturing costs can be kept down and the number of potential errors can be diminished.

Also, in select embodiments, a light assembly can be attached to the barrier without the use of external fasteners, such as screws, clamps, and the like. This simplifies inventory because less parts need to be maintained. It also simplifies assembly because no external tools are needed, such as wrenches, screwdrivers, etc. The light assembly is simply rotated by the assembler to attach the fixture to the barrier. Furthermore, the light assembly can also function as a copy of the inlet port of the barrier, thereby avoiding the need for a separate cap.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for using barrier systems, the method comprising:

positioning a plurality of barrier systems at a location, each barrier system comprising:

a barrier having an interior surface and an opposing exterior surface, the interior surface bounding a chamber that is adapted to receive a ballast; and a light assembly secured to the barrier, the light assembly comprising a housing having a lens that at least partially bounds a compartment, a light emitting device at least partially disposed within the compartment, and programmable circuity in electrical communication with the light emitting device;

communicating wirelessly with the programmable circuity of each barrier system through a control device after the barrier systems are positioned at the location so that data is transferred between the control device and the programmable circuity of each barrier system, wherein the programmable circuity of each light assembly transfers data to the control device, the data comprising a temperature reading at each light assembly or an operational condition of each light assembly.

2. The method as recited in claim 1, wherein the control device transfers data to programmable circuity of each light assembly to adjust an operational property of the light emitting device.

3. The method as recited in claim 2, wherein the operational property is the rate at which the light emitting device blinks, the intensity at which the light emitting device illuminates, the time at which the light emitting device turns on or off, or whether the light emitting device is operating in a blinking mode or a constant burn mode.

4. The method as recited in claim 1, wherein the programmable circuity of each light assembly transfers data to the control device, the data comprising GPS coordinates of each light assembly.

5. The method as recited in claim 4, further comprising the control device plotting the GPS coordinates of each light assembly on a map or grid.

6. The method as recited in claim 1, wherein the control device transfers data to the programmable circuity of each light assembly to adjust the synchronization of when each light emitting device turns on relative to the other light emitting devices.

7. The method as recited in claim 1, wherein the step of positioning a plurality of barrier systems at a location comprises positioning a plurality of barrier systems at an airport taxiway, at an airport runway, at an airport gate area, on an automobile roadway or at a construction zone.

8. The method as recited in claim 1, wherein the control device comprises a laptop computer, cellular smartphone, tablet computer, desktop computer, or specialty computer.

9. The method as recited in claim 1, wherein the light emitting device for each light assembly comprises a plurality of LEDs.

10. The method as recited in claim 9, further comprising:
each of the plurality of LEDs being configured to emit a different color; and
wherein the control device transfers data to the programmable circuity of each light assembly to separately control which of the LEDs are operating and separately control the intensity at which the LEDs are emitting light.

11. The method as recited in claim 1, further comprising dispensing a ballast into chamber of each barrier.

12. The method as recited in claim 1, further comprising a rechargeable battery at least partially disposed within the housing of each light assembly, each battery being charged by a solar cell disposed on the housing of each light assembly.

13. A method for using a barrier system, the method comprising:
positioning a barrier system at a location, the barrier system comprising:
a barrier having an interior surface and an opposing exterior surface, the interior surface bounding a chamber that is adapted to receive a ballast; and
a light assembly secured to the barrier, the light assembly comprising a housing, a lens coupled with the housing and at least partially bounding a compartment, a light emitting device at least partially disposed within the compartment, and programmable circuity in electrical communication with the light emitting device;
communicating with the programmable circuity of the barrier system through a control device after the barrier system is positioned at the location so that data is transferred between the control device and the programmable circuity of the barrier system,
wherein the programmable circuity of the light assembly transfers data to the control device, the data comprising a temperature reading at the light assembly or an operational condition of the light assembly.

14. A barrier system comprising:
a barrier having an interior surface and an opposing exterior surface, the interior surface bounding a chamber that is adapted to receive a ballast; and
a light assembly secured to the barrier, the light assembly comprising a housing having a lens that at least partially bounds a compartment, a light emitting device at least partially disposed within the compartment, and programmable circuity in electrical communication with the light emitting device, the programmable circuity comprising a computer processor, non-transitory memory, and a communication device, the communication device being configured to transmit data to and receive data from a separate control device,
wherein the programmable circuity of the light assembly is programmed to transfers data to the control device, the data comprising a temperature reading at the light assembly or an operational condition of the light assembly.

15. The barrier system as recited in claim 14, wherein the programmable circuity further comprises a GPS device.

16. The barrier system as recited in claim 14, wherein the programmable circuity further comprises an environmental sensor.

17. The barrier system as recited in claim 14, wherein the light emitting device comprises a plurality of LEDs.

18. The barrier system as recited in claim 17, wherein each of the plurality of LEDs emits a different color of light.

19. The method as recited in claim 1, wherein the data transferred by the programmable circuity of each light assembly to the control device comprises the operational condition of each light assembly.

20. The method as recited in claim 19, wherein the operational condition of each light assembly comprises at least whether the light assembly is working.

21. The method as recited in claim 1, wherein the data transferred by the programmable circuity of each light assembly to the control device comprises a temperature reading at each light assembly.

22. The method as recited in claim 13, wherein the data transferred by the programmable circuity of the light assembly to the control device comprises an operational condition of the light assembly.

23. The barrier system as recited in claim 14, wherein the programmable circuity of the light assembly is programmed to transfers data that comprises an operational condition of the light assembly.

* * * * *